(12) United States Patent
Sakata et al.

(10) Patent No.: US 7,663,699 B2
(45) Date of Patent: Feb. 16, 2010

(54) TELEVISION UNIT

(75) Inventors: Tatsuya Sakata, Tokyo (JP); Yoshito Shiraishi, Kanagawa (JP); Yutaka Miki, Chiba (JP); Eiji Koizumi, Tokyo (JP); Tomomi Araki, Saitama (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 11/599,466

(22) Filed: Nov. 15, 2006

(65) Prior Publication Data
US 2007/0146987 A1 Jun. 28, 2007

(30) Foreign Application Priority Data
Nov. 17, 2005 (JP) ............... 2005-333276

(51) Int. Cl.
*H04N 7/00* (2006.01)
(52) U.S. Cl. .................. 348/552; 345/173; 248/425; 381/17
(58) Field of Classification Search ........ 248/425, 248/176.1, 917; 381/17, 335, 385; 348/552, 348/484, 487; 345/102, 173; 312/7.7, 257.1, 312/245; 361/679.01, 679.06, 679.21, 679.23
See application file for complete search history.

(56) References Cited

U.S. PATENT DOCUMENTS

| 6,807,051 | B2 * | 10/2004 | Takahashi ............... 361/679.23 |
| 2006/0117623 | A1 | 6/2006 | Watanabe |
| 2006/0168865 | A1 | 8/2006 | Watanabe |
| 2006/0291665 | A1 * | 12/2006 | Tsuiki et al. .................. 381/17 |
| 2007/0273790 | A1 * | 11/2007 | Sakata et al. ............... 348/552 |
| 2008/0315059 | A1 * | 12/2008 | Kaneko ..................... 248/425 |

FOREIGN PATENT DOCUMENTS

| JP | 2000-165778 | 6/2000 |
| JP | 2005-165350 | 6/2005 |
| JP | 2005-303479 | 10/2005 |

* cited by examiner

*Primary Examiner*—Hung V Duong
(74) *Attorney, Agent, or Firm*—Finnegan, Henderson, Farabow, Garrett & Dunner, L.L.P.

(57) ABSTRACT

Disclosed herein is a television unit including a thin platelike display unit, a stand for rotatably supporting the display unit, and a speaker. The stand has a mounting portion adapted to be mounted at a suitable position and a swiveling portion rotatably connected to the mounting portion for supporting the display unit. The speaker is provided in the swiveling portion of the stand.

12 Claims, 21 Drawing Sheets

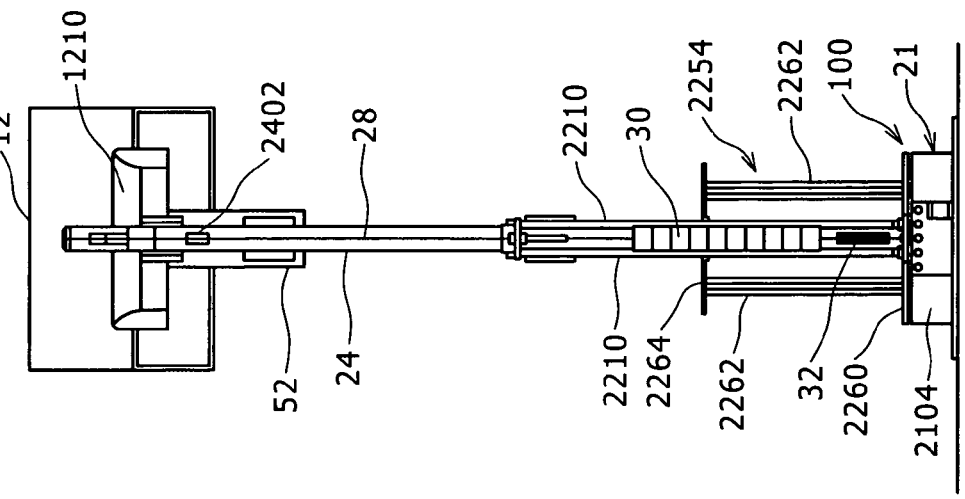
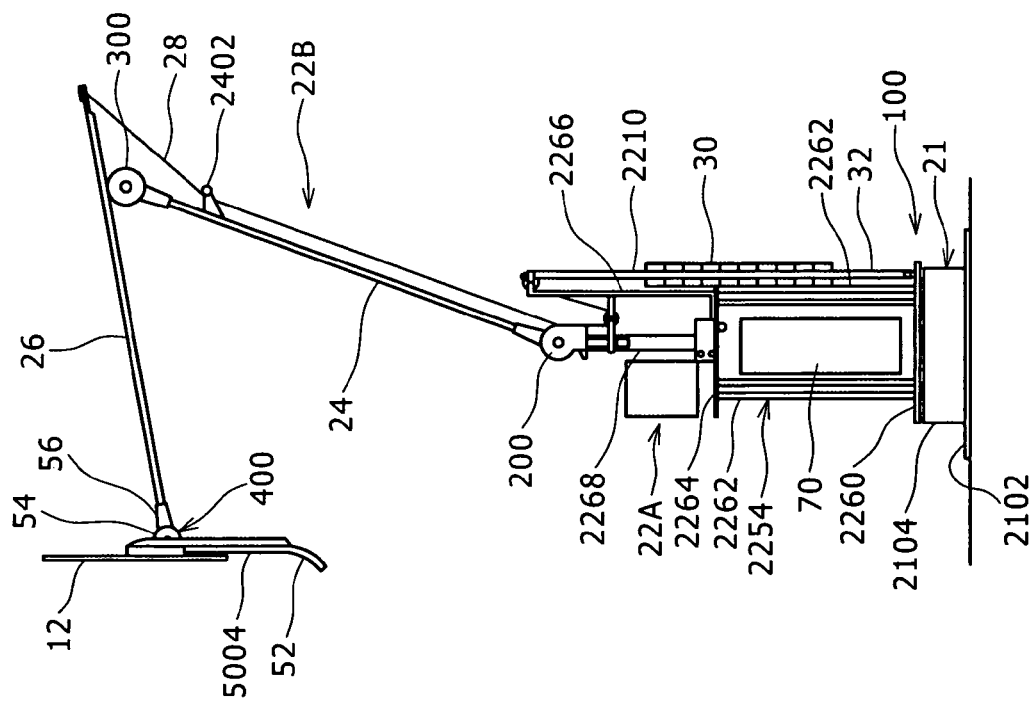

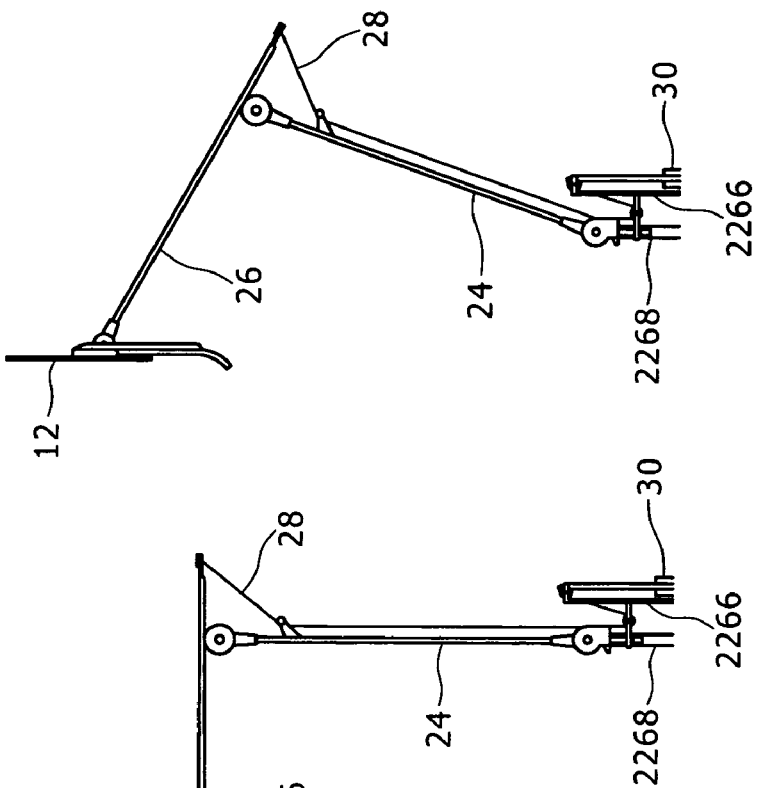
FIG. 14B
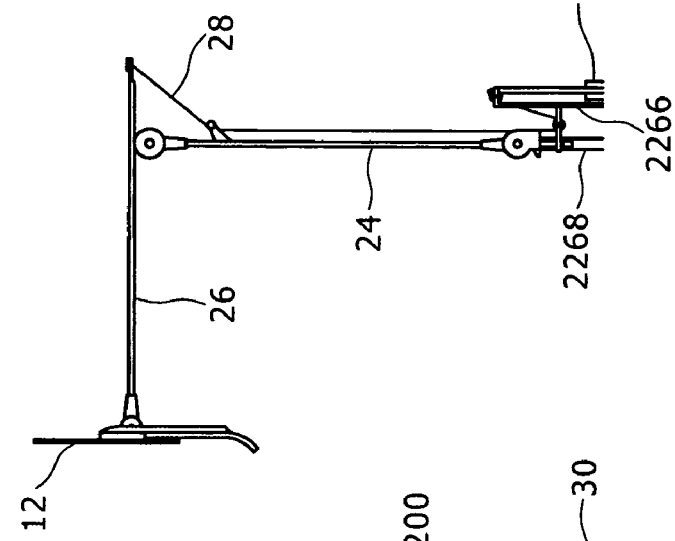
FIG. 14A
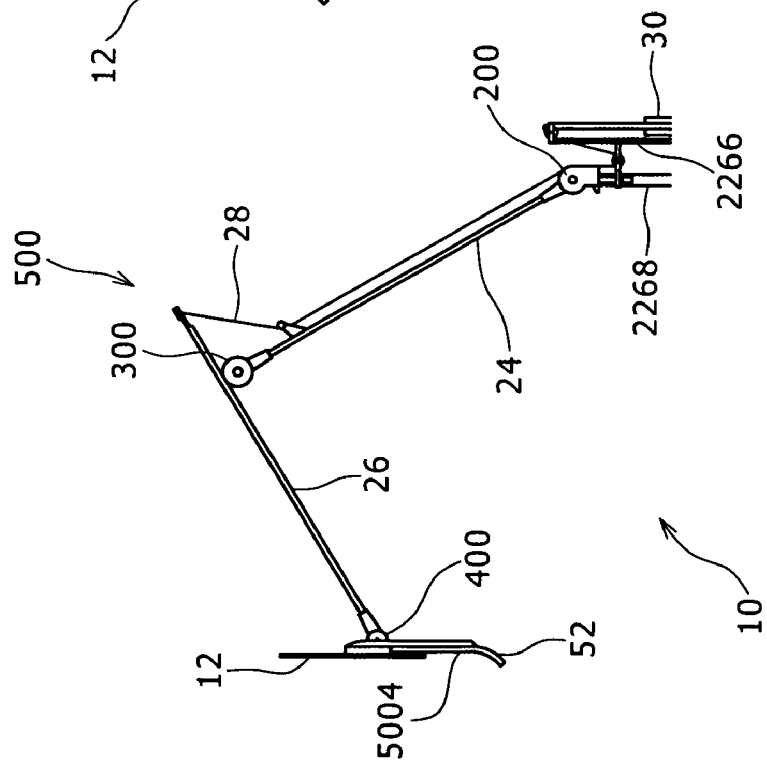

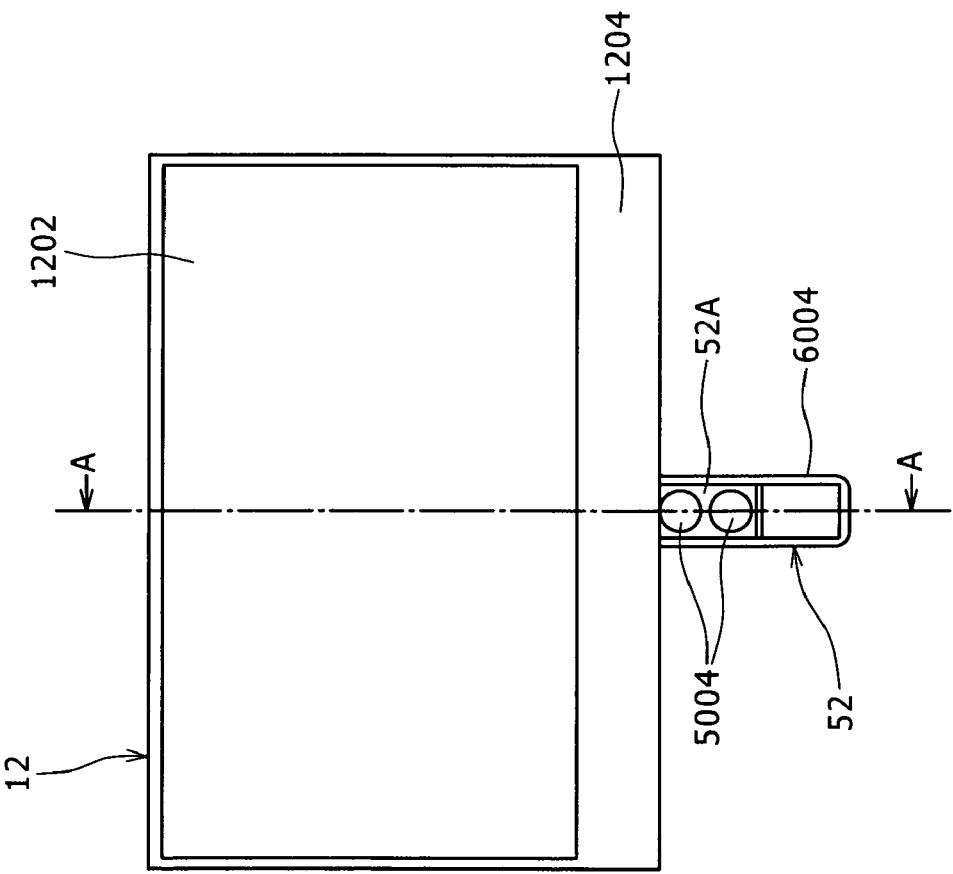
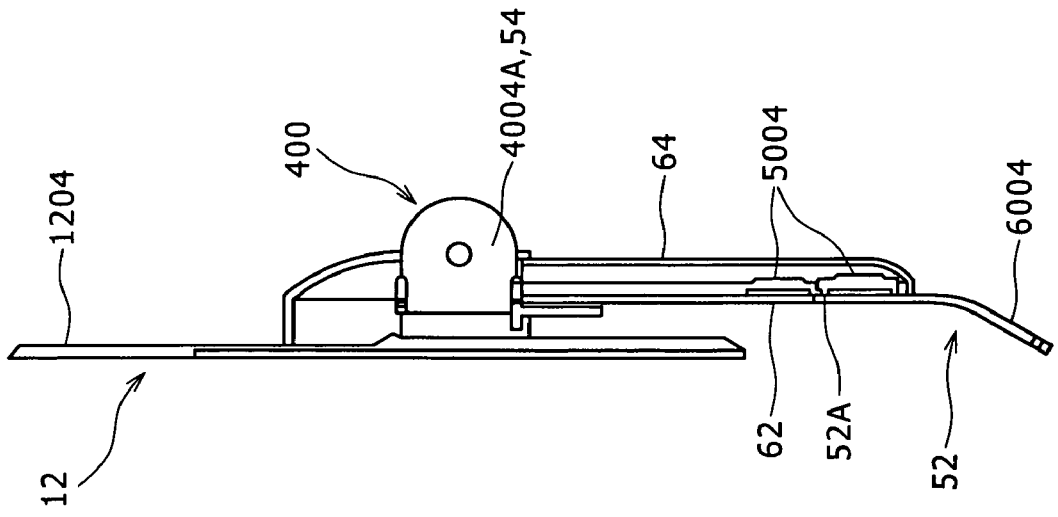
FIG. 18A
FIG. 18B

TELEVISION UNIT

CROSS REFERENCES TO RELATED APPLICATIONS

The present invention contains subject matter related to Japanese Patent Application JP 2005-333276 filed in the Japanese Patent Office on Nov. 17, 2005, the entire contents of which being incorporated herein by reference.

BACKGROUND OF THE INVENTION

1. Field of the Invention

The present invention relates to a television unit.

2. Description of the Related Art

In recent years, there has been provided a television unit including a thin platelike display panel such as a liquid crystal display panel, plasma display panel, or organic electroluminescent (organic EL) display panel, a speaker for outputting sounds, and a housing for accommodating the display panel and the speaker.

In many cases, the speaker is built in a portion of the housing on the right and left sides of the display panel or in a portion of the housing on the lower side of the display panel (see Japanese Patent Laid-Open No. 2005-165350).

SUMMARY OF THE INVENTION

In such a television unit in the past, the speaker is located at a portion of the housing on the right and left sides or on the lower side of the display panel as mentioned above. Accordingly, there is a limit in making the housing compact and thin, and the design of the television unit is also limited to cause a disadvantage in ensuring the flexibility of design.

There has been proposed a stand of a television unit having a novel design which can provide a floating feel such that the operator can feel as if a display unit is floating in the air. However, in the case that the speaker is located at a portion of the housing on the right and left sides or on the lower side of the display panel as in the established structure, the housing surrounding the display panel becomes large in size. In other words, the area of the housing that does not display an image becomes large, causing a disadvantage in providing the floating feel to the operator.

Further, in the case that the display unit is supported by the stand and that the speaker is provided in the display unit, the weight of the display unit supported by the stand becomes large. Accordingly, it is necessary to make the stand large in size, causing a disadvantage in providing the floating feel to the operator.

Further, in the case that the display unit is supported by the stand, it is considered that the stand is provided with a swiveling portion for rotatably supporting the display unit in order to change the orientation of the display unit. In this case, however, the following problem may arise when the speaker is provided separately from the stand as in a separate type audio system in the past having an amplifier, tuner, and speakers are separate from each other. When the orientation of the display unit is changed, a sound image by the sounds produced from the speaker cannot be localized in front of the display unit, causing a disadvantage such that it is difficult to provide high-quality sounds to the operator.

It is desirable to provide a television unit in which the display unit can be made compact and thin, and the flexibility of design can be ensured to improve the appearance.

It is desirable to provide a television unit which can typically provide high-quality sounds irrespective of the orientation of the display unit.

In accordance with the present invention, there is provided a television unit including a thin platelike display unit, a stand for rotatably supporting the display unit, and a speaker. In the television unit, the stand includes a mounting portion adapted to be mounted at a suitable position and a swiveling portion rotatably connected to the mounting portion for supporting the display unit. The speaker is provided in the swiveling portion of the stand. Preferably, the speaker is provided in the swiveling portion so that sounds produced from the speaker are oriented toward the front side of the display unit.

According to an embodiment of the present invention, the speaker is provided in the swiveling portion rather than in the display unit. Accordingly, a frame surrounding a display panel of the display unit can be reduced in size, so that it is advantageous in providing the floating feel on the display unit to the operator, thus improving the design.

Further, the speaker is provided in the swiveling portion so that sounds produced from the speaker are oriented toward the front side of the display unit. Accordingly, even when the display unit is turned, a sound image by the sounds produced from the speaker can typically be localized in front of the display unit.

Further, since the speaker is provided in the swiveling portion, the stand for supporting the display unit can be reduced in size and weight, and it is therefore advantageous in providing the floating feel to the operator.

BRIEF DESCRIPTION OF THE DRAWINGS

FIGS. 2A and 2B are side and rear elevations of the television unit, respectively, in the condition that a cover shown in FIG. 1 is removed;

FIGS. 14A, 14B, and 14C are side views for illustrating the operation of a stand;

FIG. 18A is a front elevation of the display unit;

FIG. 18B is a cross section taken along the line A-A in FIG. 18A;

DETAILED DESCRIPTION OF THE PREFERRED EMBODIMENTS

First Preferred Embodiment

A first preferred embodiment of the present invention will now be described in detail with reference to FIGS. 1 to 22.

Figure 1:
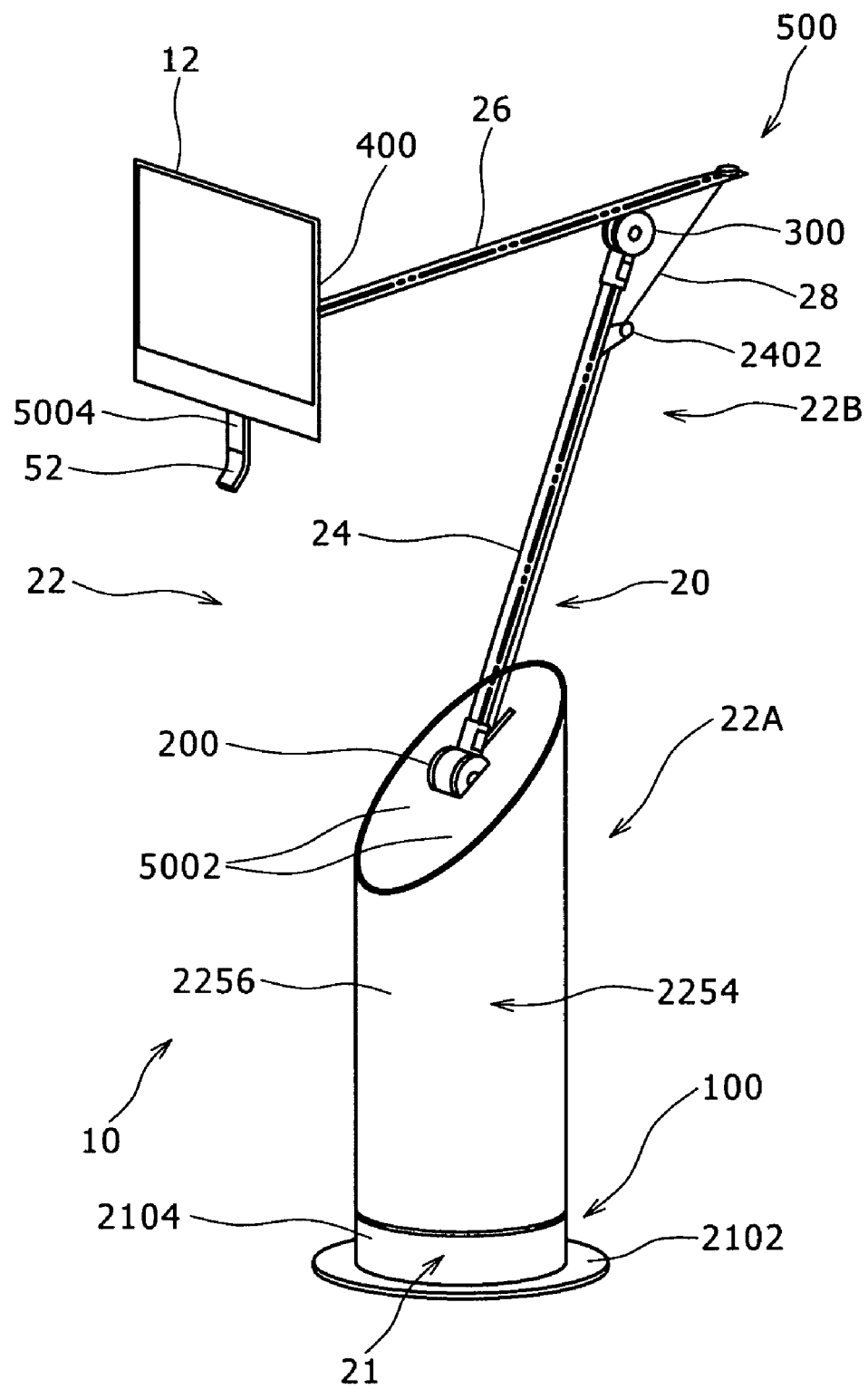
FIG. 1 is a perspective view of a television unit according to a first preferred embodiment of the present invention.

Referring to FIG. 1, there is shown a perspective view of a television unit 10 according to the first preferred embodiment of the present invention.

FIGS. 2A and 2B are side and rear elevations of the television unit 10, respectively. In FIGS. 2A and 2B, a cover 2256 shown in FIG. 1 is not shown for the purpose of illustration.

As shown in FIGS. 1, 2A, and 2B, the television unit 10 includes a display unit 12, a speaker 50 (see FIG. 19), and a stand 20 for supporting the display unit 12. The stand 20 includes a position changing mechanism for changeably holding the position of the display unit 12 and a tablike handle 52 for changing the position of the display unit 12.

The position changing mechanism includes a swivel mechanism 100, a first pivot portion 200, a second pivot portion 300, a third pivot portion 400, and a three-dimensional moving portion 500.

The display unit 12 will now be described.

Figure 16A:
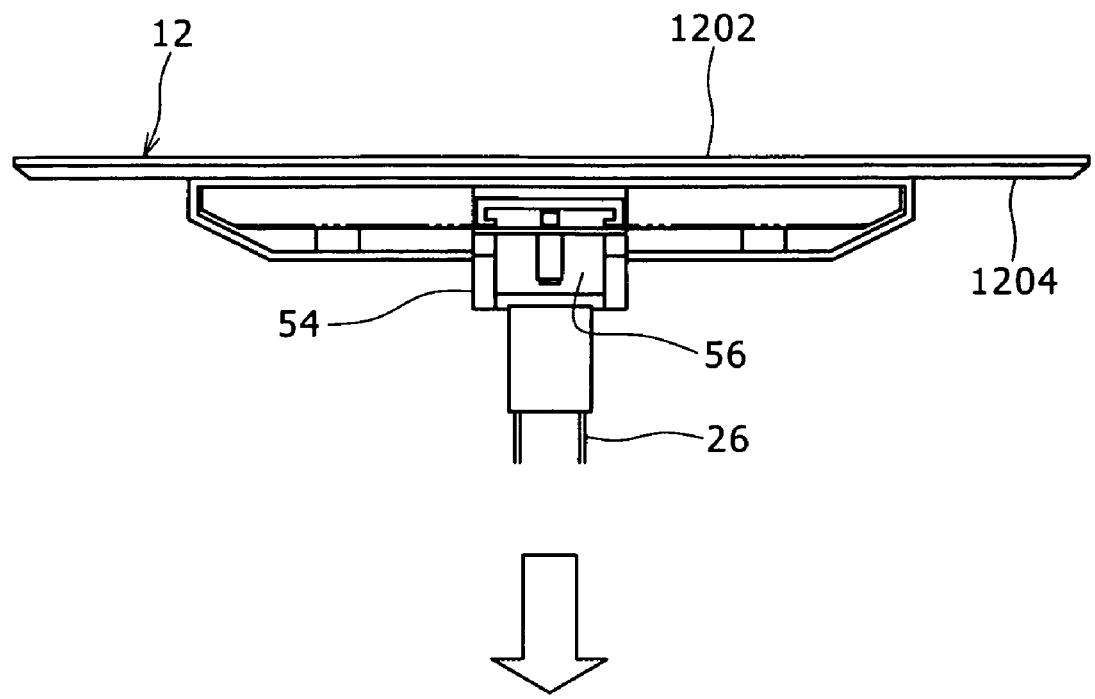
FIG. 16A is a view taken in the direction shown by an arrow A in FIG. 15.

As shown in FIG. 16A, the display unit 12 includes a display panel 1202 and a thin platelike frame 1204 for supporting the display panel 1202.

In this preferred embodiment, the display panel 1202 is configured by using an organic EL display. Alternatively, the display panel 1202 may be configured by using a plasma display or a liquid crystal display.

In FIG. 2B, reference numeral 1210 denotes a hinge cover.

The stand 20 will now be described.

As shown in FIG. 1, the stand 20 has a mounting portion 21 adapted to be mounted at a suitable position and a swiveling portion 22 rotatably connected to the mounting portion 21 for supporting the display unit 12.

The swiveling portion 22 is composed of a lower swiveling portion 22A rotatably connected to the mounting portion 21 and an upper swiveling portion 22B provided on the upper side of the lower swiveling portion 22A and formed so as to have a sectional area smaller than that of the lower swiveling portion 22A and to have a front end for supporting the display unit 12.

The upper swiveling portion 22B includes a first arm 24, a second arm 26, a wire 28, a weight 30, and a coil spring 32.

The first arm 24 projects upward from the upper end of the lower swiveling portion 22A, and the second arm 26 is connected to the upper end of the first arm 24. The display unit 12 is supported to the front end of the second arm 26.

More specifically, the mounting portion 21 and the lower swiveling portion 22A are connected through the swivel mechanism 100. The first arm 24 and the lower swiveling portion 22A are connected through the first pivot portion 200 at the base end (lower end) of the first arm 24. The second arm 26 and the first arm 24 are connected through the second pivot portion 300 at a position near the base end (rear end) of the second arm 26 corresponding to the upper end of the first arm 24. The back surface of the display unit 12 and the second arm 26 are connected through the third pivot portion 400 at the front end of the second arm 26.

Figure 3:
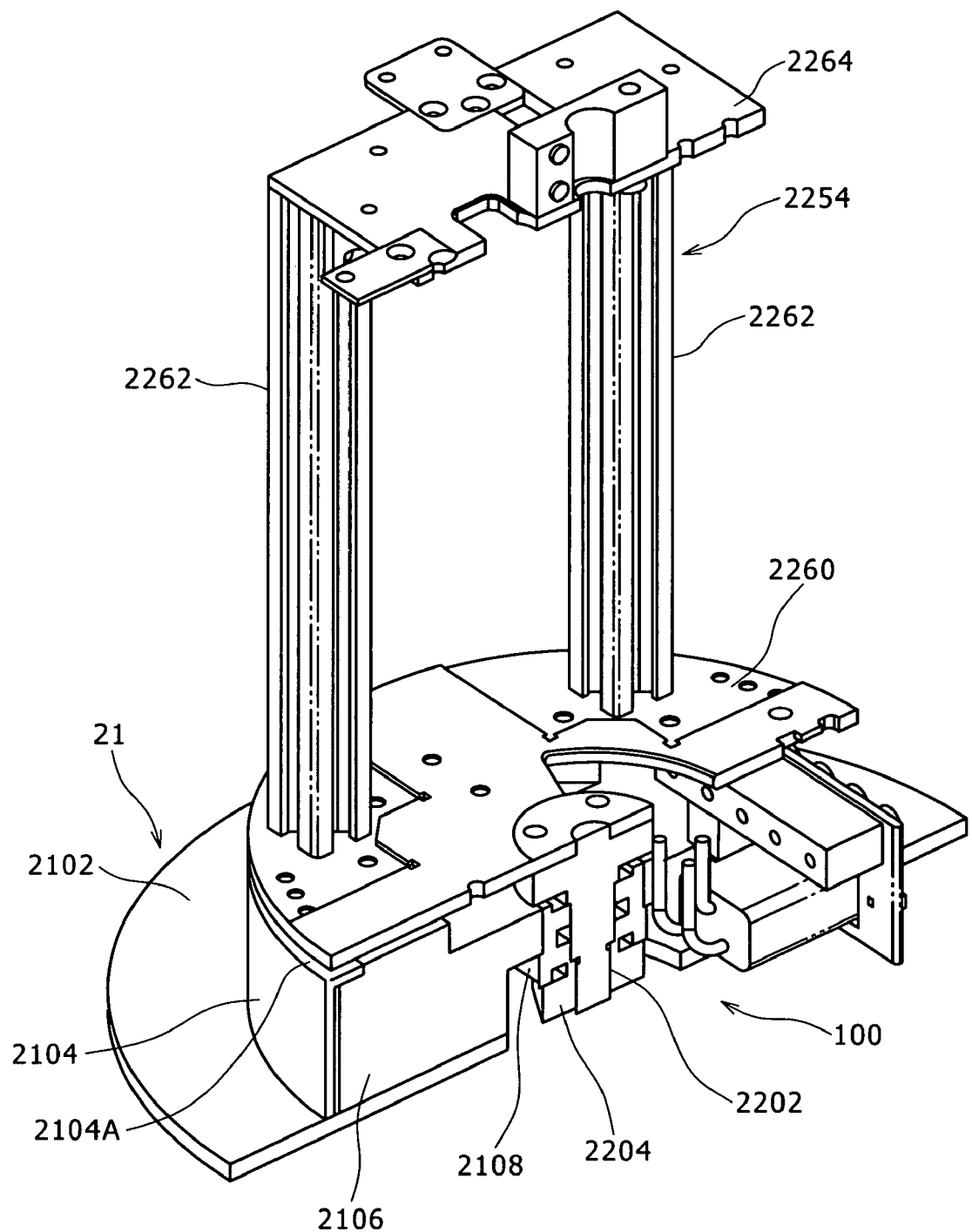
FIG. 3 is a partially cutaway, perspective view showing the configuration of a mounting portion.
Figure 4:
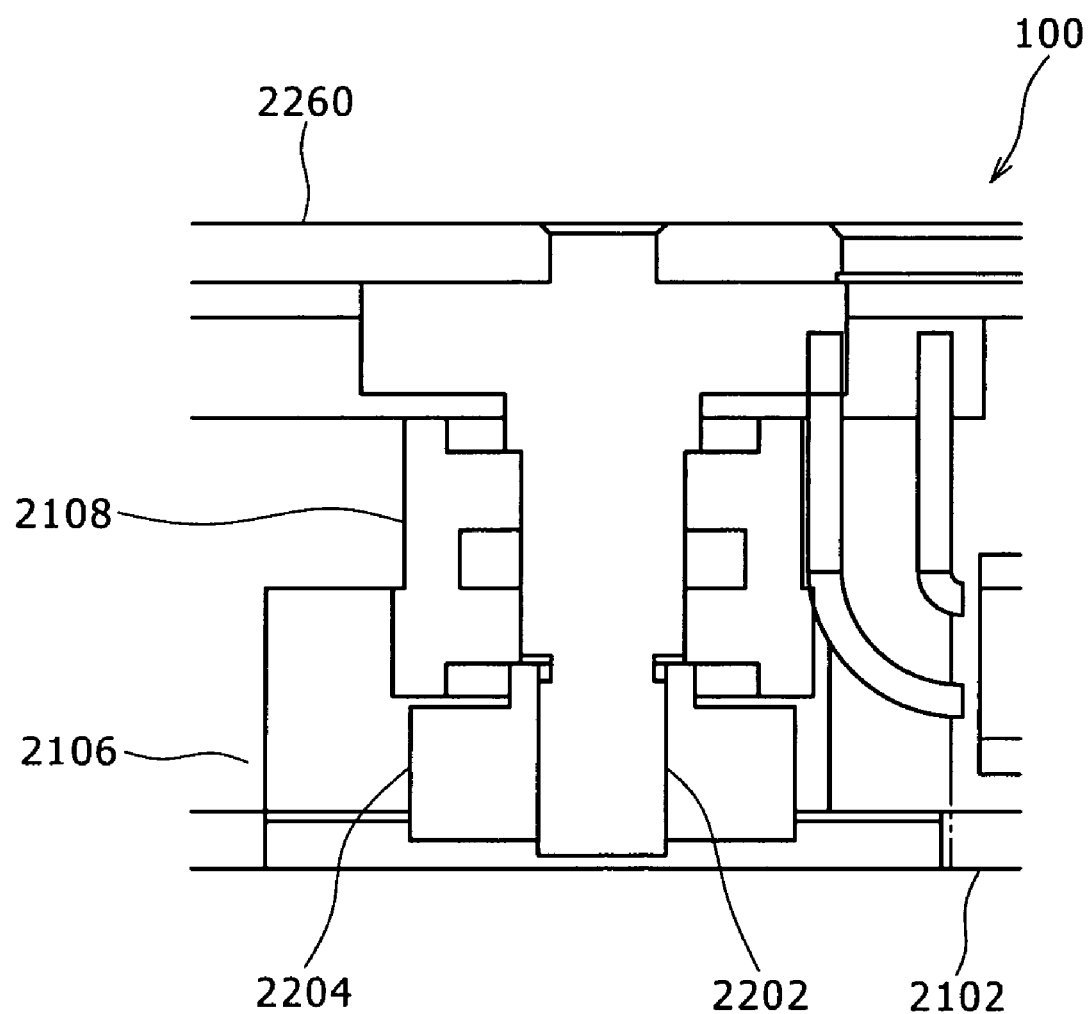
FIG. 4 is a vertical sectional view of an essential part shown in FIG. 3.

FIG. 3 is a partially cutaway, perspective view showing the configuration of the mounting portion 21, and FIG. 4 is a vertical sectional view of an essential part shown in FIG. 3.

As shown in FIG. 3, the mounting portion 21 includes an annular mounting plate 2102 adapted to be mounted on a desk, shelf, or floor, a cylindrical cover 2104 rising from an inner circumferential portion of the mounting portion 2102, and a base member 2106 provided inside of the cover 2104.

As shown in FIGS. 3 and 4, a bearing member 2108 having a vertically extending axis is provided at the center of the base member 2106.

The swivel mechanism 100 functions to rotatably support the lower swiveling portion 22A to the mounting portion 21, and includes a mount surface 2104A on which the lower surface of the lower swiveling portion 22A is mounted, a shaft 2202 projecting downward from the center of the lower swiveling portion 22A and inserted through the bearing member 2108, and a ring 2204 mounted on the lower end of the shaft 2202 and coming into contact with the lower surface of the bearing member 2108 to prevent the removal of the shaft 2202. The configuration of the swivel mechanism 100 is not limited to the above, but various structures known in the art may be adopted.

The lower swiveling portion 22A includes a frame 2254 (see FIG. 2A) and a cover 2256 (see FIG. 1) for covering the frame 2254.

As shown in FIGS. 2A, 2B, and 3, the frame 2254 includes a disk-shaped bottom plate 2260, four legs 2262 rising from the bottom plate 2260, a top plate 2264 supported to the upper ends of the four legs 2262, and a bracket 2266 supported to the upper surface of the top plate 2264. The shaft 2202 projects downward from the bottom plate 2260.

As shown in FIG. 2A, a signal box 70 is provided inside of the cover 2256 of the lower swiveling portion 22A.

The signal box 70 functions to display an image on the display panel 1202 of the display unit 12 and also to output a sound from the speaker 50 according to radio waves received from a broadcasting station or according to an image signal and an audio signal supplied from an external unit.

Figure 19:
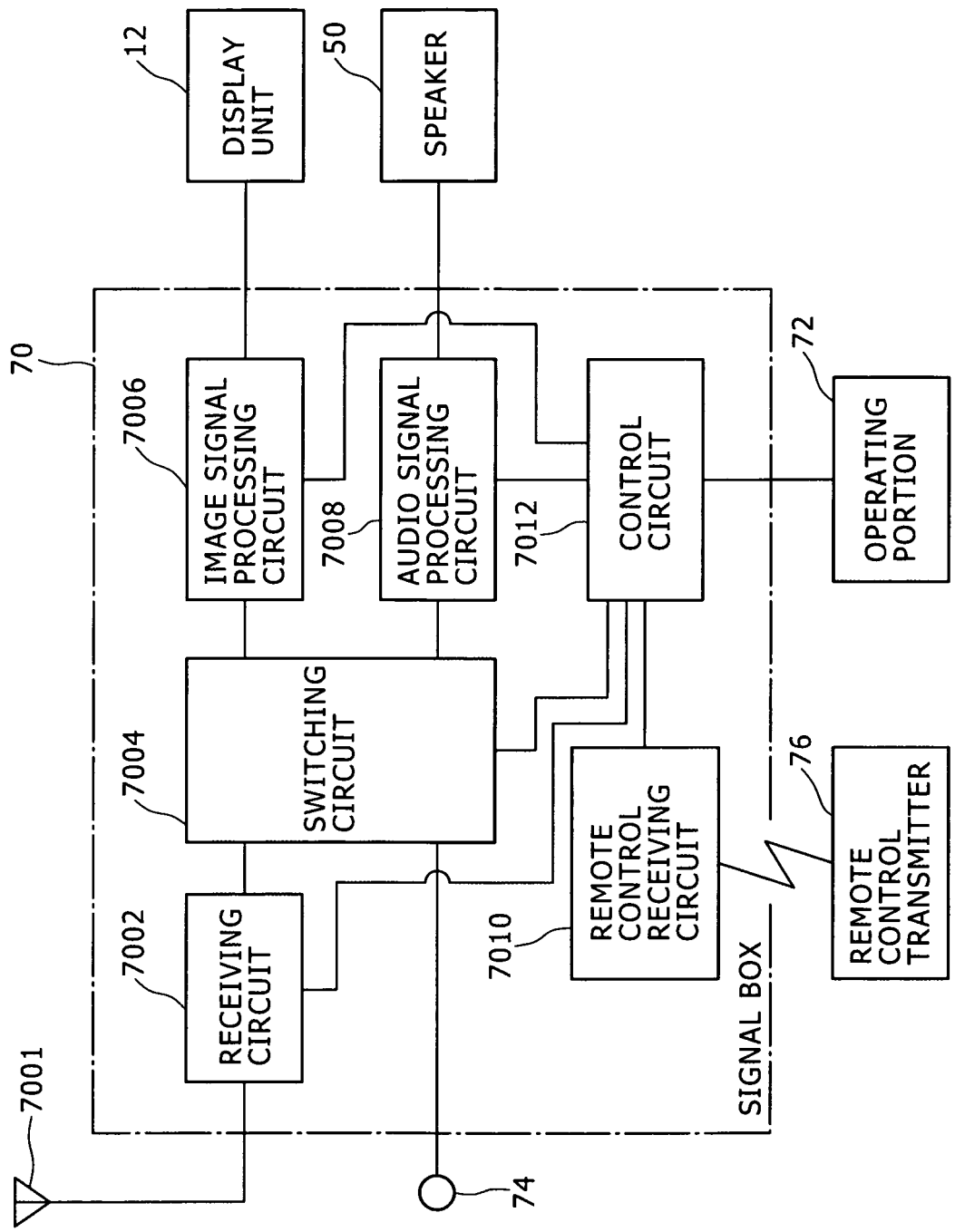
FIG. 19 is a block diagram showing the configuration of a signal box.

FIG. 19 is a block diagram showing the configuration of the signal box 70.

The signal box 70 includes a receiving circuit 7002, switching circuit 7004, image signal processing circuit 7006, audio signal processing circuit 7008, remote control receiving circuit 7010, and control circuit 7012. The signal box 70 is connected to an operating portion 72 and an external input terminal 74 both provided independently of the signal box 70.

The operating portion 72 is adapted to be operated by the operator to perform various operations and settings related to watching and listening of broadcast on the television unit 10. For example, the operating portion 72 includes a channel selection button, volume control button, and input selection button. The operating portion 72 is provided on the outer surface of the cover 2256, for example.

The external input terminal 74 is a terminal for inputting an image signal and an audio signal supplied from an external unit such as a DVD player or a video deck. The external input terminal 74 is provided on the outer surface of the cover 2256, for example.

The receiving circuit 7002 functions to tune according to a command from the control circuit 7012 and to demodulate a television signal received from an antenna 7001, separate the television signal into an image signal and an audio signal, and output these image and audio signals.

The switching circuit 7004 functions to switch between the combined image and audio signals supplied from the receiving circuit 7002 and the combined image and audio signals supplied from the external unit through the external input terminal 74 and to supply the image signal and the audio signal selected above to the image signal processing circuit 7006 and the audio signal processing circuit 7008, respectively.

The image signal processing circuit 7006 functions to perform necessary signal processing for the image signal input from the switching circuit 7004 and to generate a drive signal for driving the display unit 12, then supplying the drive signal to the display unit 12.

The audio signal processing circuit 7008 functions to perform necessary signal processing and amplification processing for the audio signal input from the switching circuit 7004 and to generate a drive signal for driving the speaker 50, then supplying the drive signal to the speaker 50, whereby sounds are generated from the speaker 50.

The remote control receiving circuit 7010 functions to receive by a radio signal (infrared signal) a control command transmitted from a remote control transmitter 76 provided independently of the television unit 10 for instructing various operations including channel selection, volume control, and input selection and to supply the control command thus received to the control circuit 7012.

The control circuit 7012 functions to perform channel selection control of the receiving circuit 7002, switching control of the switching circuit 7004 for the image and audio signals, control of the image signal processing circuit 7006, and control of the audio signal processing circuit 7008 based on the operation performed on the operating portion 72 or the control command provided from the remote control receiving circuit 7010.

Figure 5A:
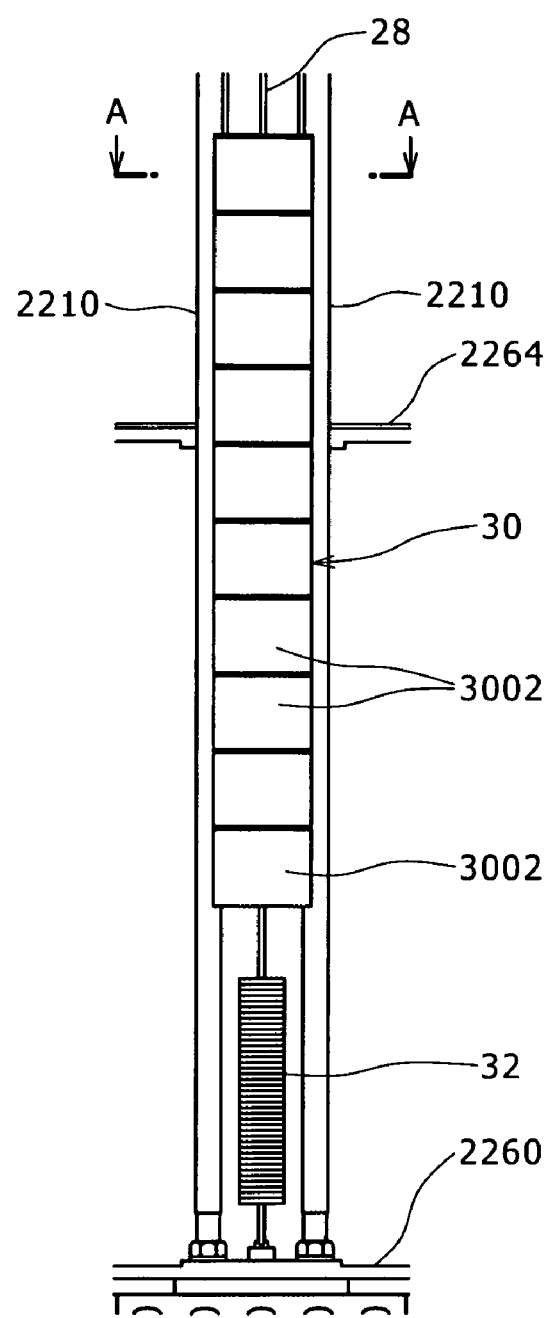
FIG. 5A is an enlarged elevational view of a weight, a coil spring, and their associated parts.
Figure 5B:
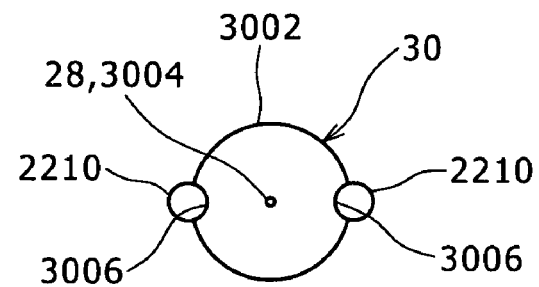
FIG. 5B is a cross section taken along the line A-A in FIG. 5A.
Figure 6:
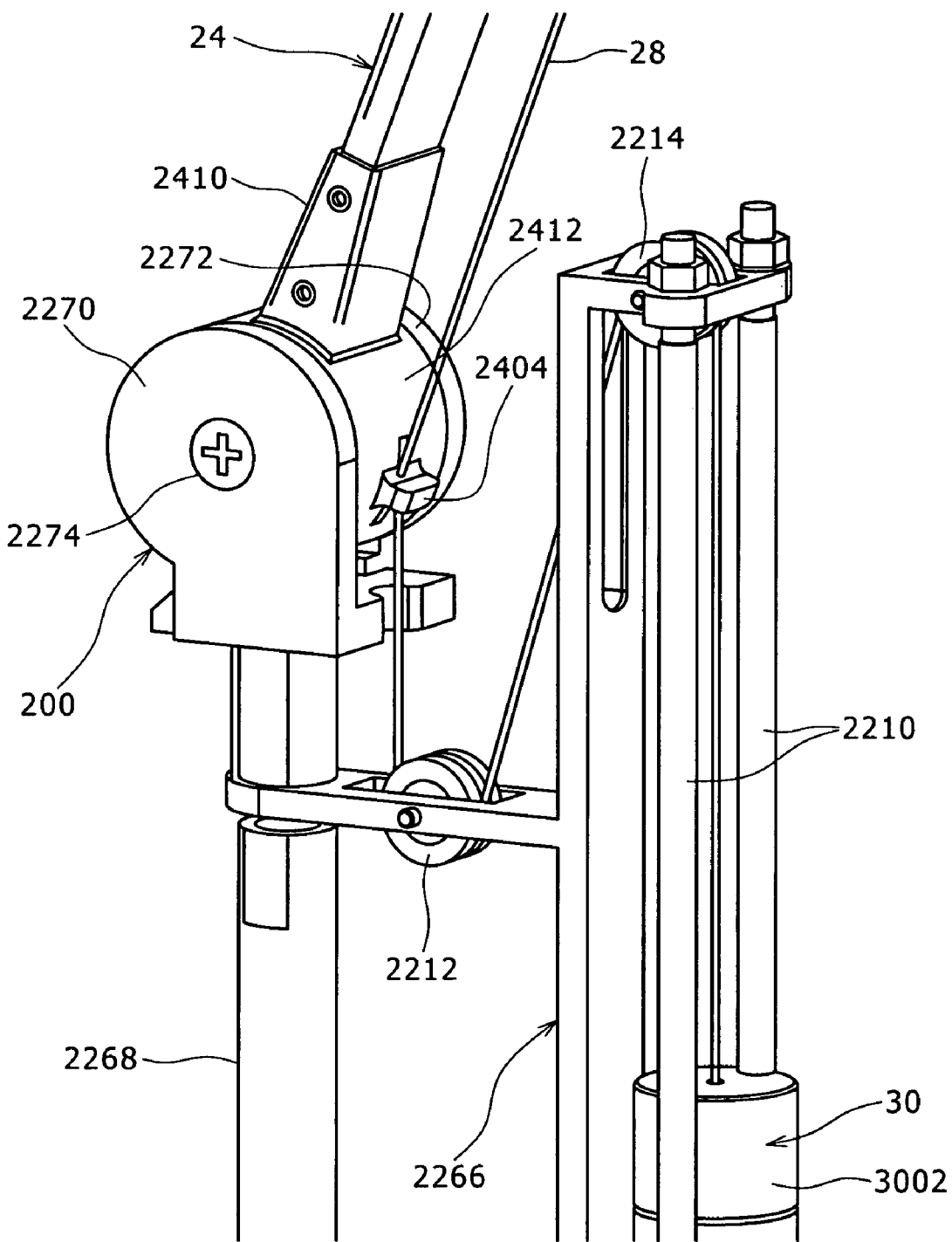
FIG. 6 is an enlarged perspective view of an upper portion of a lower swiveling portion.

FIG. 5A is an enlarged elevational view of the weight 30, the coil spring 32, and their associated parts, FIG. 5B is a cross section taken along the line A-A in FIG. 5A, and FIG. 6 is an enlarged perspective view of an upper portion of the lower swiveling portion 22A.

The weight 30 is supported in the lower swiveling portion 22A so as to be movable in the vertical direction.

As shown in FIGS. 5A and 6, the weight 30 is composed of a plurality of solid cylindrical weight elements 3002.

As shown in FIG. 5B, each weight element 3002 is formed with a central through hole 3004 for insertion of the wire 28 and two arcuate guide grooves 3006 on the outer circumferential surface of each weight element 3002 at radially opposite positions thereof.

Two guide shafts 2210 rise from the bottom plate 2260 and engage with the guide grooves 3006 of each weight element 3002, so that each weight element 3002 is vertically movably supported to the guide shafts 2210.

As shown in FIG. 2A, the wire 28 is connected at one end thereof to the rear end of the second arm 26, and an intermediate portion of the wire 28 is wrapped on a pulley 2402 provided on the first arm 24. The wire 28 extends along the first arm 24 toward the lower swiveling portion 22A. As shown in FIG. 6, the direction of extension of the wire 28 extending along the first arm 24 is changed by a guide member 2404 provided at the lower end of the first arm 24, and is wrapped on a pulley 2212 provided at an intermediate portion of the bracket 2266 and a pulley 2214 provided at the upper end of the bracket 2266. The wire 28 further extends downward from the pulley 2214 through the central through holes 3004 of the weight elements 3002, and the other end of the wire 28 is connected to the lowermost weight element 3002.

As shown in FIG. 5A, the coil spring 32 is connected between the lowermost weight element 3002 and the bottom plate 2260 to normally downward bias the weight 30.

As shown in FIG. 2A, rotational moment produced by the weight of the display unit 12 and the weight of the second arm 26 is counterbalanced with rotational moment produced by the weight of the weight 30 and the elastic force of the coil spring 32 through the wire 28 at the second pivot portion 300.

Figure 11:
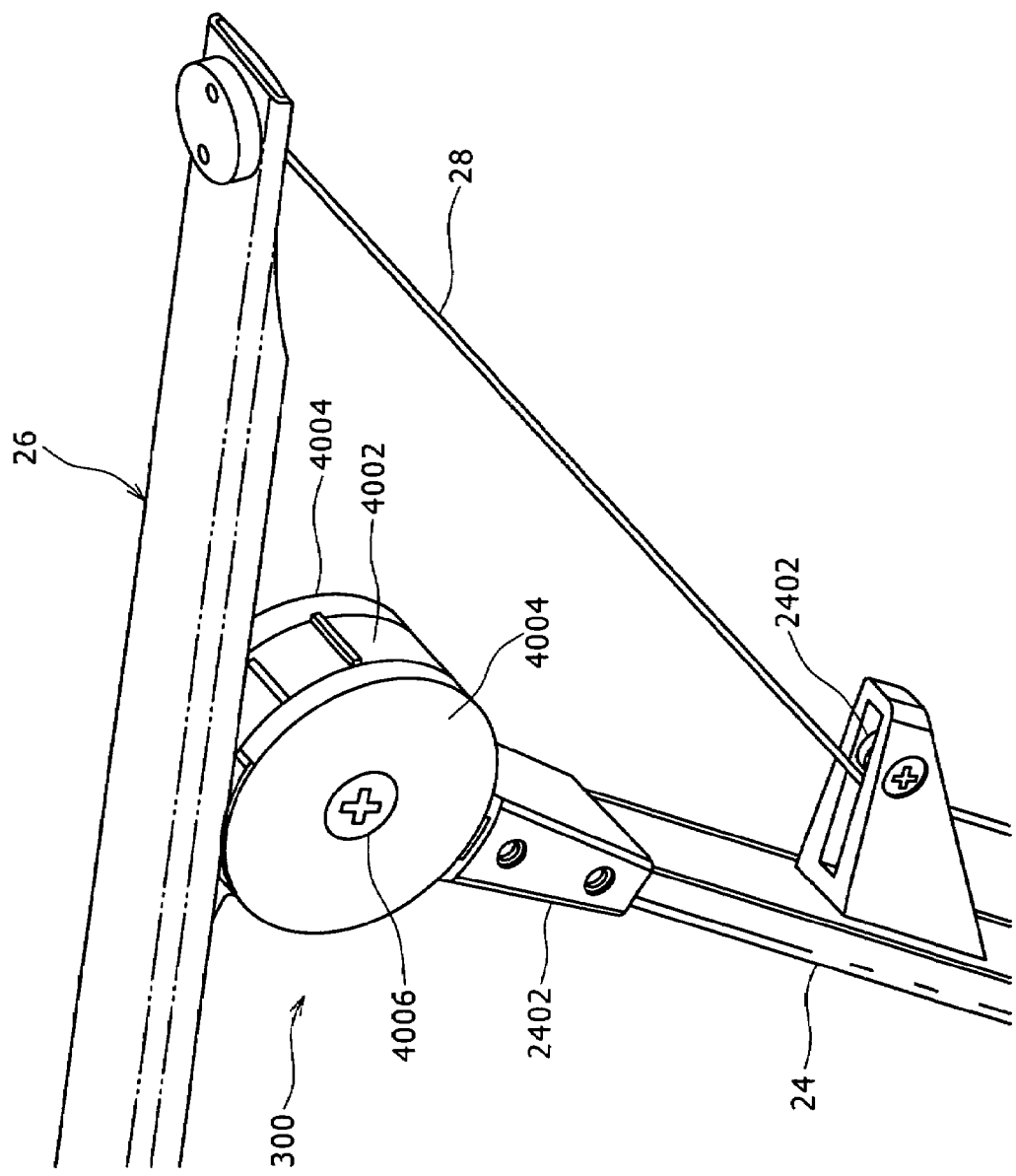
FIG. 11 is an enlarged perspective view of a second pivot portion.
Figure 12:
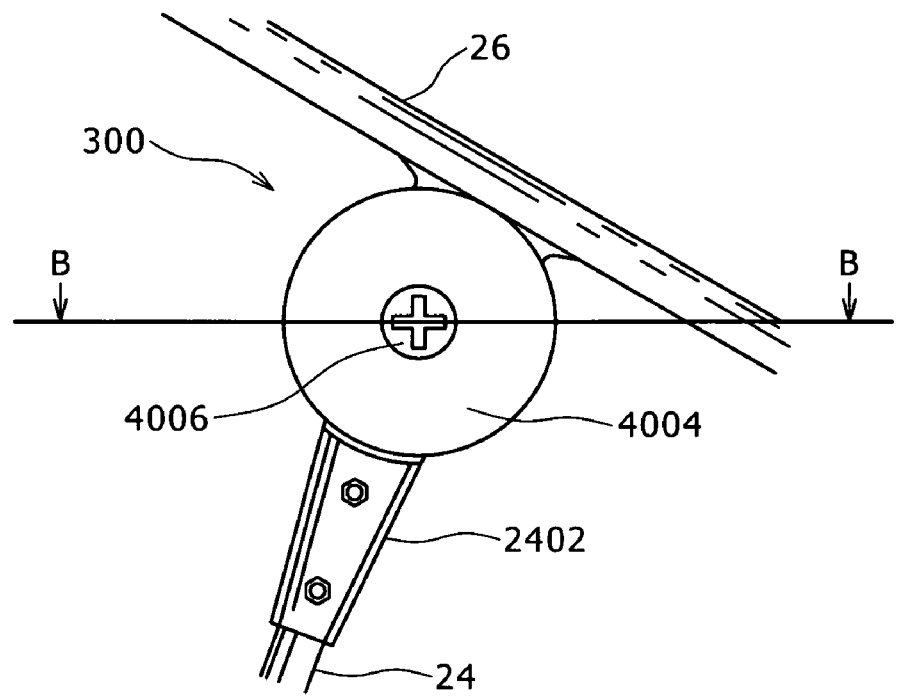
FIG. 12 is a side view of the second pivot portion.
Figure 13:
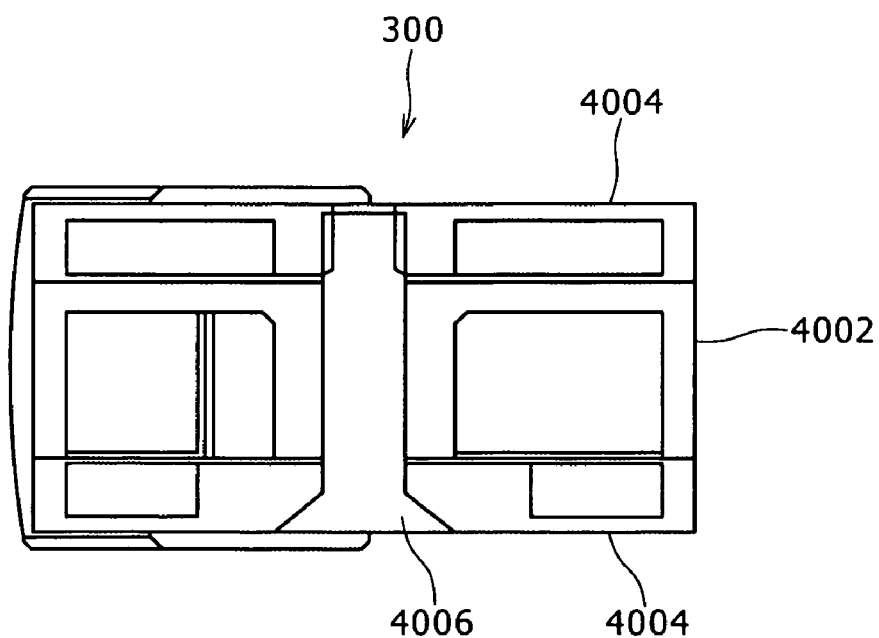
FIG. 13 is a cross section taken along the line B-B in FIG. 12.

FIG. 11 is an enlarged perspective view of the second pivot portion 300, FIG. 12 is a side view of the second pivot portion 300, and FIG. 13 is a cross section taken along the line B-B in FIG. 12.

As shown in FIGS. 11 to 13, the second arm 26 is connected at its rear end portion through the second pivot portion 300 to the upper end of the first arm 24 so as to be vertically pivotable.

The second pivot portion 300 is configured to hold a pivoted condition of the second arm 26 with respect to the first arm 24 by using a frictional force.

More specifically, the second pivot portion 300 is composed of a friction plate 4002 mounted through a bracket 2402 to the upper end of the first arm 24, the friction plate 4002 being formed of a material having a large coefficient of friction, a pair of holding plates 4004 provided on the second arm 26 at a position near the rear end thereof for holding the friction plate 4002 on both sides thereof, and a screw 4006 for adjusting the distance between the holding plates 4004. A force of holding the friction plate 4002 by means of the holding plates 4004 is adjusted by loosening or tightening the screw 4006. In other words, the frictional force between each holding plate 4004 and the friction plate 4002 is adjusted by rotating the screw 4006, thereby holding desirable pivoted condition of the second arm 26 with respect to the first arm 24. However, the configuration of the second pivot portion 300 is not limited to the above, but various structures known in the art may be adopted.

Figure 7:
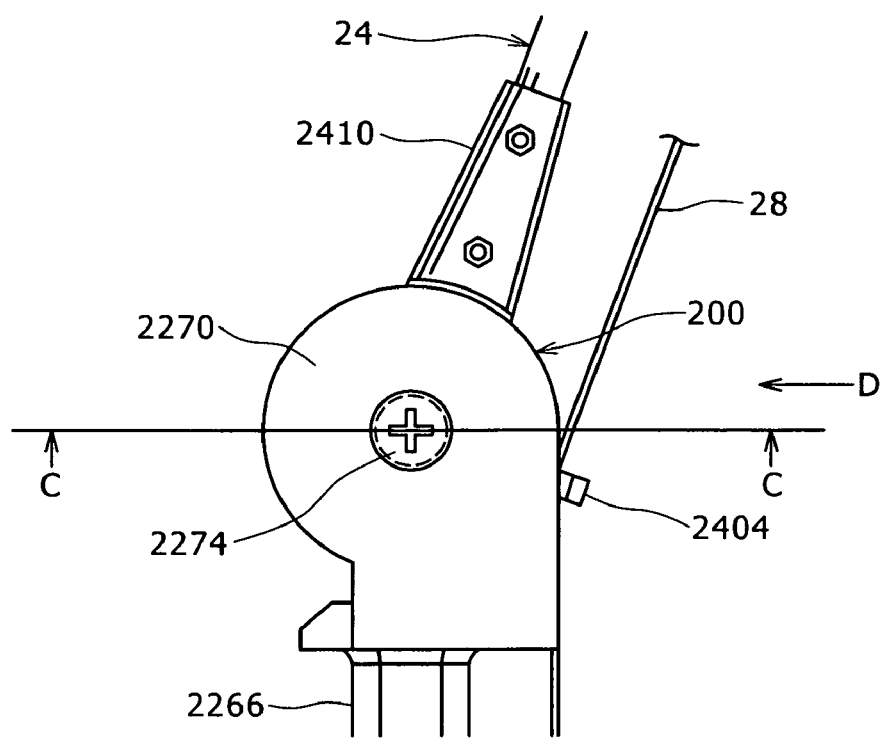
FIG. 7 is a side view of a first pivot portion.
Figure 8:
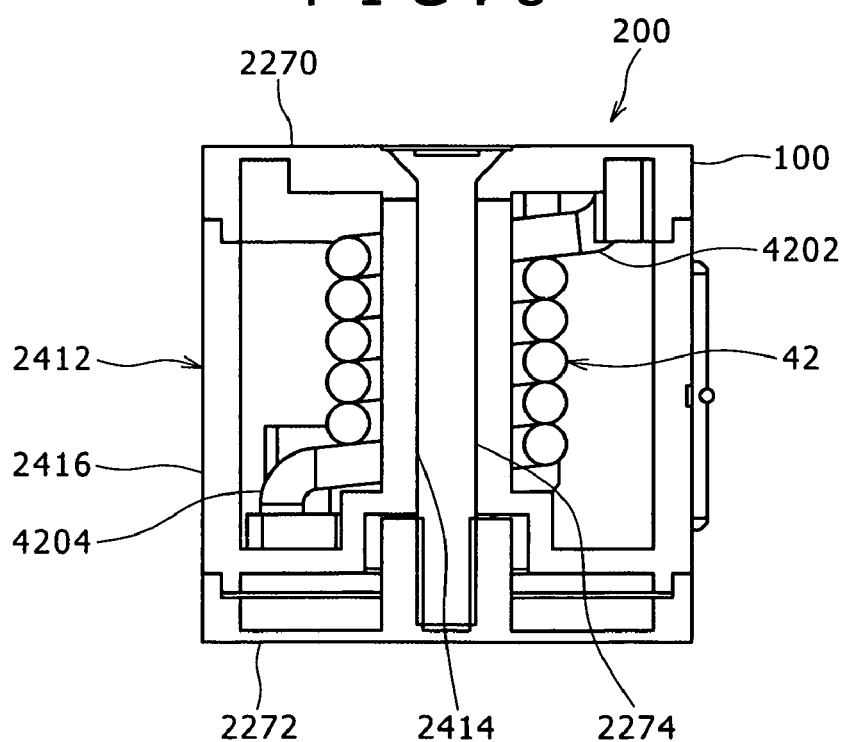
FIG. 8 is a cross section taken along the line C-C in FIG. 7.
Figure 9:
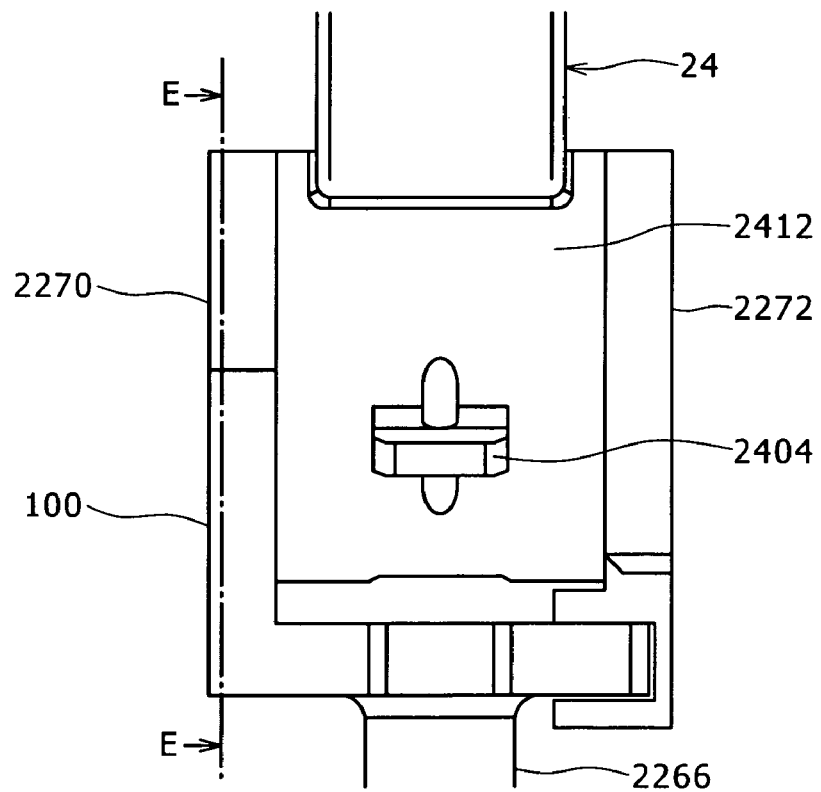
FIG. 9 is a view taken in the direction shown by an arrow D in FIG. 7.
Figure 10:
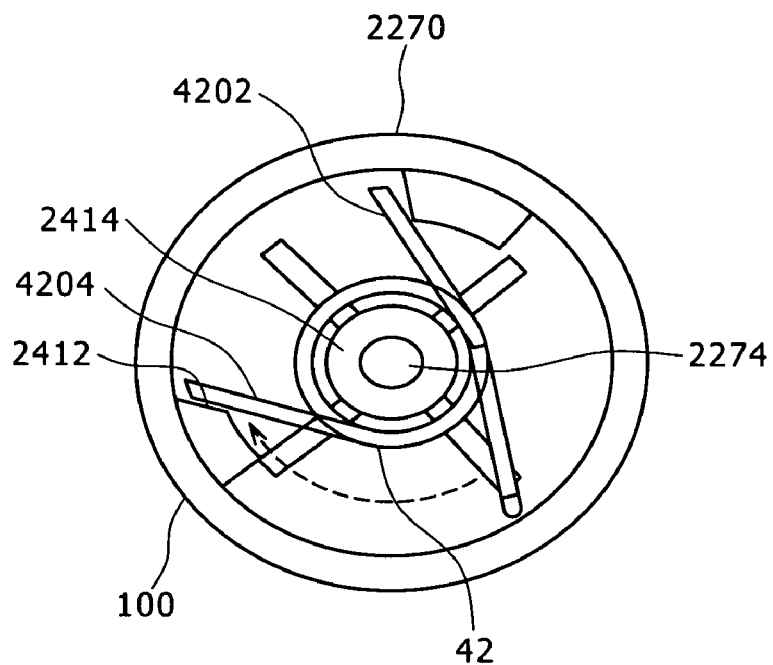
FIG. 10 is a cross section taken along the line E-E in FIG. 9.

FIG. 7 is a side view of the first pivot portion 200, FIG. 8 is a cross section taken along the line C-C in FIG. 7, FIG. 9 is a view taken in the direction shown by an arrow D in FIG. 7, and FIG. 10 is a cross section taken along the line E-E in FIG. 9.

As shown in FIG. 7, the first arm 24 is connected at its lower end through the first pivot portion 200 to the lower swiveling portion 22A so as to be vertically pivotable.

The first pivot portion 200 has a torsion spring 42 for producing rotational moment counterbalancing with rotational moment produced by the weight of the display unit 12, the weight of the second arm 26, and the weight of the first arm 24. Further, the first pivot portion 200 is configured to hold a pivoted condition of the first arm 24 with respect to the lower swiveling portion 22A by using a frictional force.

As shown in FIGS. 6 to 9, a first bracket 2270 and a second bracket 2272 are provided at an intermediate portion of the bracket 2266 so as to be opposed to each other, and a screw 2274 is inserted through the first bracket 2270 so as to connect the first and second brackets 2270 and 2272.

A cylindrical member 2412 formed of a material having a large coefficient of friction is mounted through a bracket 2410 to the lower end of the first arm 24.

As shown in FIG. 8, the cylindrical member 2412 has an inner cylindrical portion 2414 through which the screw 2274 is inserted and an outer cylindrical portion 2416 formed radially outside of the inner cylindrical portion 2414. Thus, the cylindrical member 2412 is rotatably supported to the screw 2274.

As shown in FIGS. 8 and 10, the torsion spring 42 is provided in an annular space defined between the inner cylindrical portion 2414 and the outer cylindrical portion 2416. One end 4202 of the torsion spring 42 is engaged with the first bracket 2270, and the other end 4204 of the torsion spring 42 is engaged with the cylindrical member 2412 against the elasticity of a coil portion of the torsion spring 42 as shown by a dotted arrow in FIG. 10. Accordingly, the elastic force of the torsion spring 42 is applied both to the bracket 2266 and to the lower end of the first arm 24 in the circumferential direction of the screw 2274.

Further, a force of holding the cylindrical member 2412 between the opposed brackets 2270 and 2272 is adjusted by loosening or tightening the screw 2274. In other words, the frictional force between each of the brackets 2270 and 2272 and the cylindrical member 2412 is adjusted by rotating the screw 2274, thereby holding a desirable pivoted condition of the first arm 24 with respect to the lower swiveling portion 22A. However, the configuration of the first pivot portion 200 is not limited to the above, but various structures known in the art may be adopted.

As shown in FIGS. 2A and 6, the intermediate portion of the bracket 2266 for mounting the first pivot portion 200 is supported to the upper end of a vertical rod 2268 rising from the bottom plate 2264.

As shown in FIG. 2A, the display unit 12 is connected through the third pivot portion 400 to the front end of the second arm 26 so as to be vertically pivotable.

Figure 15:
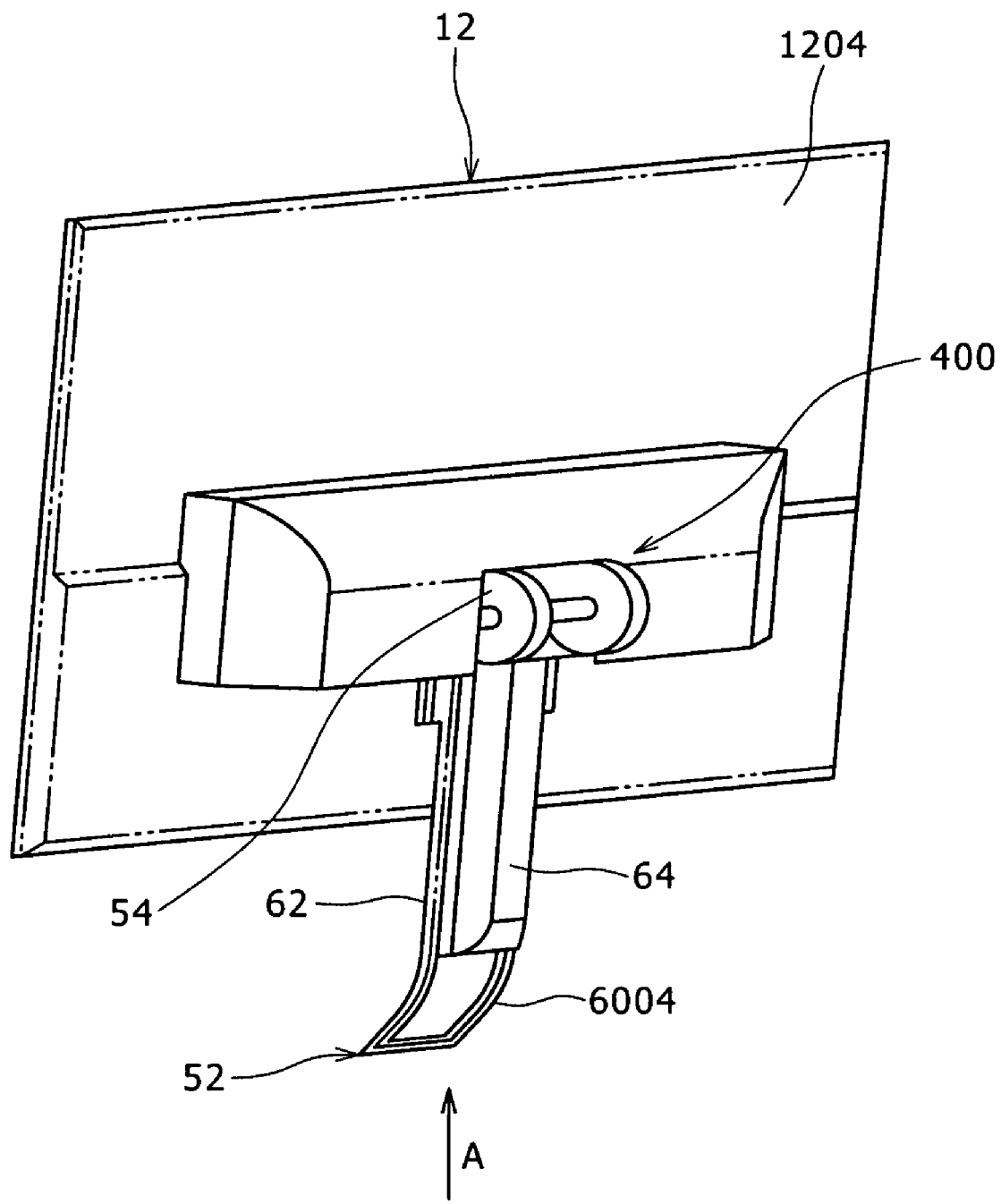
FIG. 15 is a perspective view showing the back surface of a display unit.
Figure 16B:
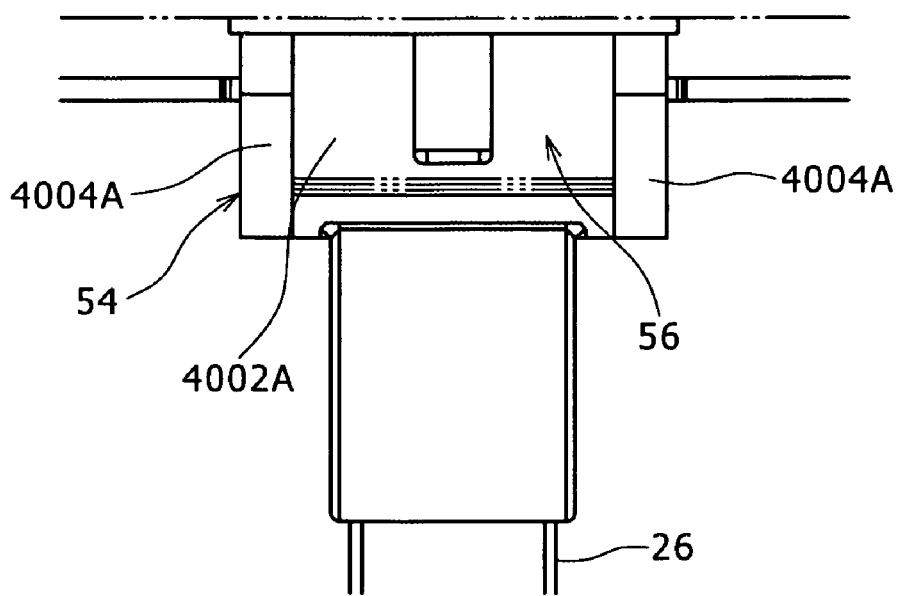
FIG. 16B is an enlarged view of an essential part in FIG. 16A.

FIG. 15 is a perspective view showing the back surface of the display unit 12, FIG. 16A is a view taken in the direction shown by an arrow A in FIG. 15, and FIG. 16B is an enlarged view of an essential part in FIG. 16A.

As shown in FIGS. 15, 16A, and 16B, the third pivot portion 400 includes a first member 54 mounted on the back surface of the display unit 12 and a second member 56 mounted to the front end of the stand 20 (the second arm 26) and connected to the first member 54 so as to be vertically pivotable.

The third pivot portion 400 is configured so as to hold a pivoted condition of the display unit 12 with respect to the front end of the second arm 26 by using a frictional force.

As shown in FIG. 16B, the third pivot portion 400 has a structure similar to the structure of the second pivot portion 300 shown in FIG. 13. More specifically, the third pivot portion 400 includes a pair of holding plates 4004A opposed to each other, a cylindrical friction plate 4002A held between the holding plates 4004A, and a screw 4006A (see FIG. 17) inserted through the holding plates 4004A and the friction plate 4002A for adjusting the distance between the holding plates 4004A. A force of holding the friction plate 4002A on both sides thereof by means of the holding plates 4004A is adjusted by loosening or tightening the screw 4006A. In other words, the frictional force between each holding plate 4004A and the friction plate 4002A is adjusted by rotating the screw 4006A so that the display unit 12 is connected through the third pivot portion 400 to the front end of the second arm 26 so as to be vertically pivotable.

The holding plates 4004A are included in the first member 54, and the friction plate 4002A is included in the second member 56. The configuration of the third pivot portion 400 is not limited to the above, but various structures known in the art may be adopted.

With the configuration of the stand 20 having the position changing mechanism mentioned above, the following operation and effect can be exhibited.

FIGS. 14A, 14B, and 14C are side views for illustrating the operation of the stand 20.

As shown in FIGS. 14A to 14C, the handle 52 is gripped by the operator's hand to move the display unit 12 to a desired position.

With the movement of the display unit 12, the swiveling portion 22 is swiveled with respect to the mounting portion 21 by the swivel mechanism 100. Further, the upper swiveling portion 22B is vertically pivoted with respect to the lower swiveling portion 22A by the first pivot portion 200. Further, the second arm 26 is vertically pivoted with respect to the first arm 24 by the second pivot portion 300. Further, the display unit 12 is vertically pivoted with respect to the second arm 26 by the third pivot portion 400.

When the desired position of the display unit 12 is obtained, the operator's hand is removed from the handle 52.

The desired position of the display unit 12 thus obtained is held by the swivel mechanism 100, the pivot portions 200, 300, and 400, the weight 30, the coil spring 32, and the torsion spring 42.

The operations of the pivot portions 200, 300, and 400, the weight 30, the coil spring 32, and the torsion spring 42 will now be described. The rotational moment produced by the weight of the display unit 12, the weight of the second arm 26, and the weight of the first arm 24 is counterbalanced with the rotational movement produced by the elastic force of the torsion spring 42 at the first pivot portion 200.

Further, the rotational moment produced by the weight of the display unit 12 and the weight of the second arm 26 is counterbalanced with the rotational moment produced by the weight of the weight 30 and the elastic force of the coil spring 32 at the second pivot portion 300.

The pivoted condition of the first and second arms 24 and 26 is held by using the frictional forces produced in the first and second pivot portions 200 and 300.

Accordingly, the first and second arms 24 and 26 supporting the display unit 12 large in weight can be moved smoothly and simply, and it is therefore advantageous in improving the ease of use.

Thus, the display unit 12 can be moved in the frontward and rearward directions, in the rightward and leftward directions, and in the upward and downward directions by operating the handle 52. Accordingly, the three-dimensional moving portion 500 is configured by the swivel mechanism 100, the first pivot portion 200, the second pivot portion 300, the third pivot portion 400, the weight 30, the coil spring 32, and the torsion spring 42.

The speaker 50 shown in FIG. 19 is composed of a pair of first right-channel and left-channel speakers 5002 for mainly outputting sounds in the middle frequency range and in the low frequency range and a pair of second right-channel and left-channel speakers 5004 for mainly outputting sounds in the high frequency range.

Figure 17:
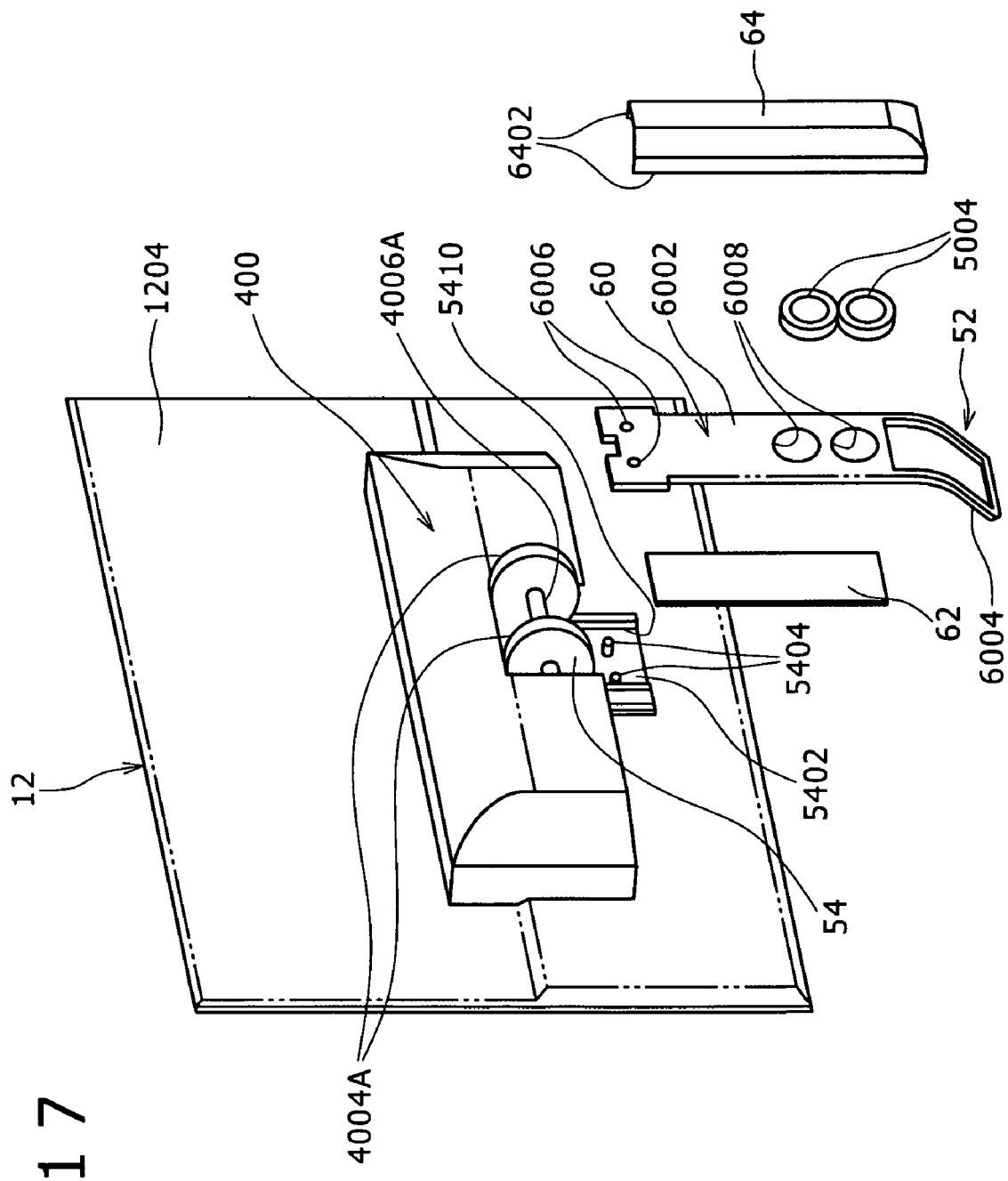
FIG. 17 is an exploded perspective view showing the configurations of second speakers and a handle.

FIG. 17 is an exploded perspective view showing the configurations of the second speakers 5004 and the handle 52, FIG. 18A is a front elevation of the display unit 12, and FIG. 18B is a cross section taken along the line A-A in FIG. 18A.

As shown in FIGS. 17, 18A, and 18B, the handle 52 is mounted on the first member 54 and projects downward from a lower central portion of the display unit 12.

The handle 52 has a speaker mounting portion 52A projecting outside of the contour of the display unit 12 as viewed from the front side of the display unit 12.

The second speakers 5004 are provided at the speaker mounting portion 52A of the handle 52.

More specifically, as shown in FIG. 17, the handle 52 includes a handle body 60, a front cover 62, and a rear cover 64. The handle 52 is detachably mounted at its upper end portion in a mounting recess 5402 of the first member 54.

The handle body 60 has a substantially rectangular plate portion 6002 having a thickness, a width larger than the thickness, and a length larger than the width. The handle body 60 further has a hollow frame portion 6004 connected to the lower end of the plate portion 6002 in an integral manner.

The frame portion 6004 is adapted to be gripped by the operator's hand in moving the display unit 12. Accordingly, the handle body 60 is formed of a rigid material such as hard synthetic resin or metal material.

The upper end portion of the handle body 60 is formed with two insert holes 6006 for insertion of two pins 5404 projecting from the bottom surface of the mounting recess 5402 of the first member 54.

The frame portion 6004 is gently curved toward the front side of the display unit 12 as extending downward for the purpose of easy gripping.

The lower portion of the plate portion 6002 of the handle body 60 near the frame portion 6004 is formed with a pair of circular windows 6008 for mounting the pair of second speakers 5004, respectively. These windows 6008 are vertically arranged in a line in the longitudinal direction of the plate portion 6002.

The second speakers 5004 are bonded to the rear surface of the handle body 60 by using an adhesive so as to be exposed to the respective windows 6008.

The rear cover 64 for covering the rear side of the second speakers 5004 is disposed on the rear surface of the plate portion 6002 of the handle body 60, and the front cover 62 having sound dissipation holes for allowing the pass of sounds produced from the second speakers 5004 is disposed on the front surface of the plate portion 6002 of the handle body 60. In this disposed condition of the front and rear covers 62 and 64 on the handle body 60, the front surface of the front cover 62 is made to abut against the bottom surface of the mounting recess 5402, and the pins 5404 are inserted through the insert holes 6006 of the handle body 60. Further, a pair of right and left engaging portions 6402 formed at the right and left portion of the rear cover 64 are engaged with a pair of right and left grooves 5410 formed on the bottom surface of the mounting recess 5402, respectively, thus detachably mounting the handle 52 to the first member 54.

In the condition where the handle 52 is mounted on the first member 54 as shown in FIGS. 18A and 18B, the second speakers 5004 are positioned outside of the contour of the display unit 12.

Accordingly, the handle 52 is moved together with the display unit 12 in changing the position of the display unit 12. In other words, the position of the handle 52 relative to the display unit 12 is fixed. Since the second speakers 5004 are provided on the handle 52, the sounds produced from the second speakers 5004 are typically oriented to the front side of the display unit 12 (the display panel 1202) even when the position of the display unit 12 is changed.

In other words, the second speakers 5004 are provided on the handle 52 so as to produce sounds toward the front side of the display unit 12.

Figure 20:
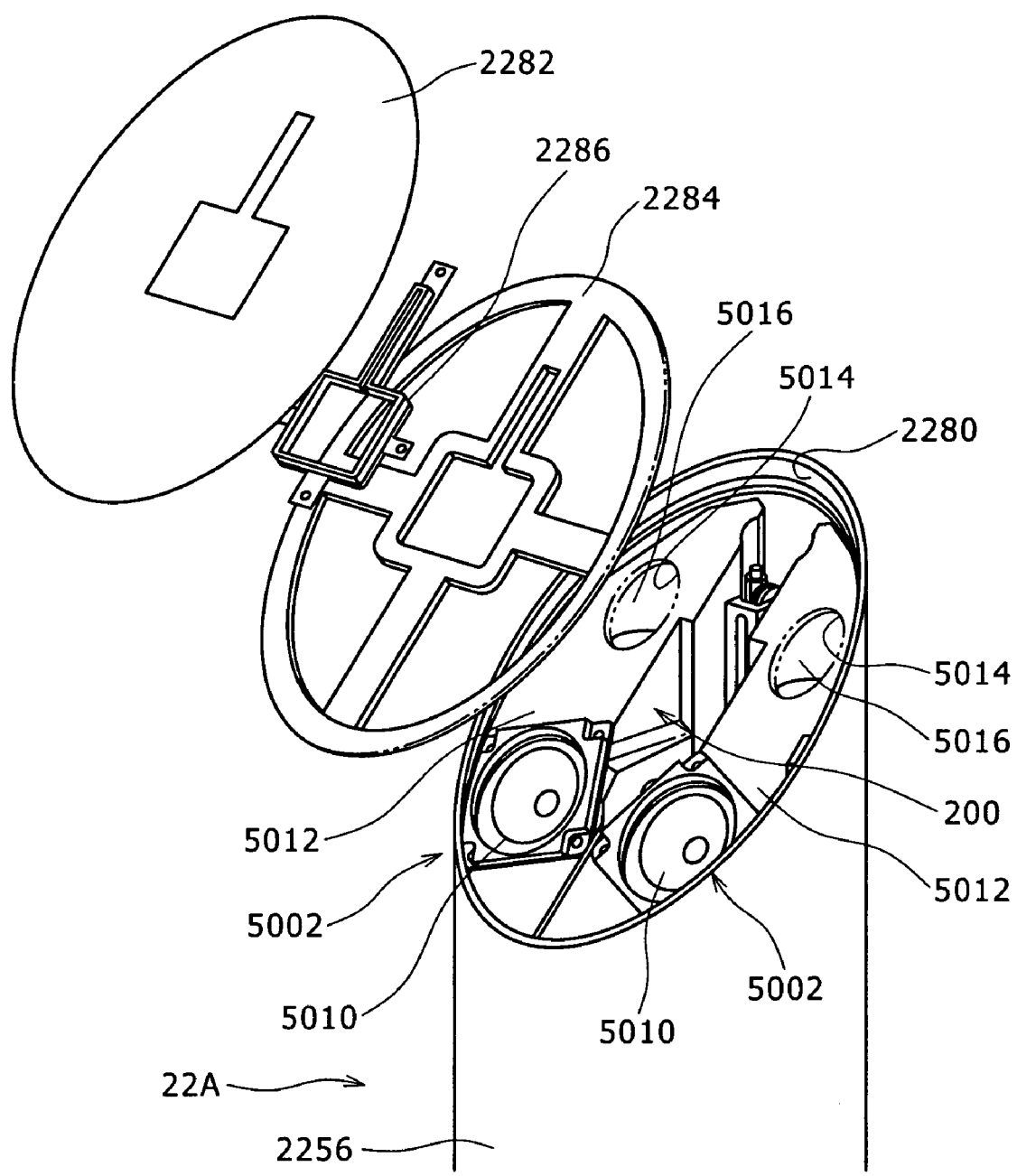
FIG. 20 is an exploded perspective view showing a mounting structure of first speakers.
Figure 21:
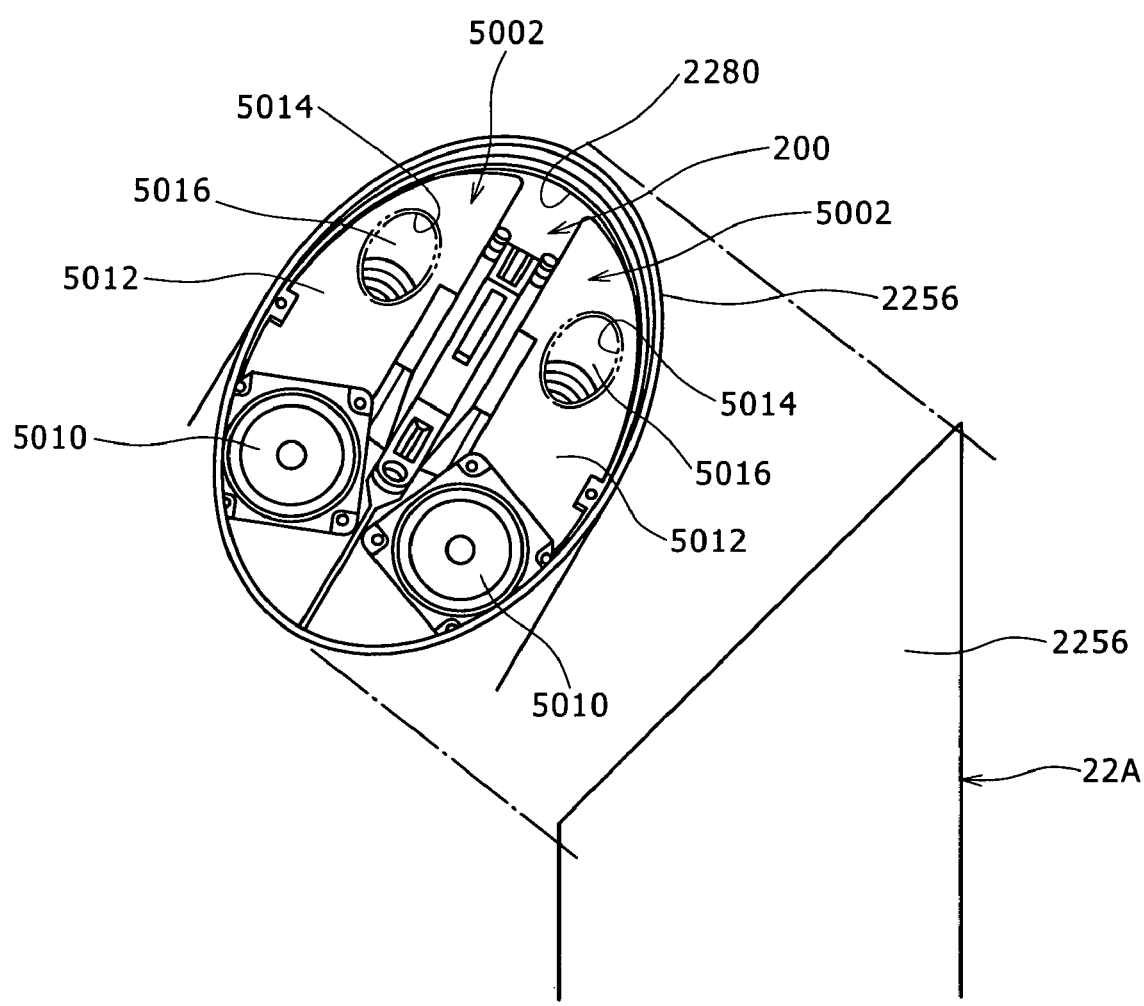
FIG. 21 is a plan view illustrating the first speakers provided at the upper end of the cover.
Figure 22:
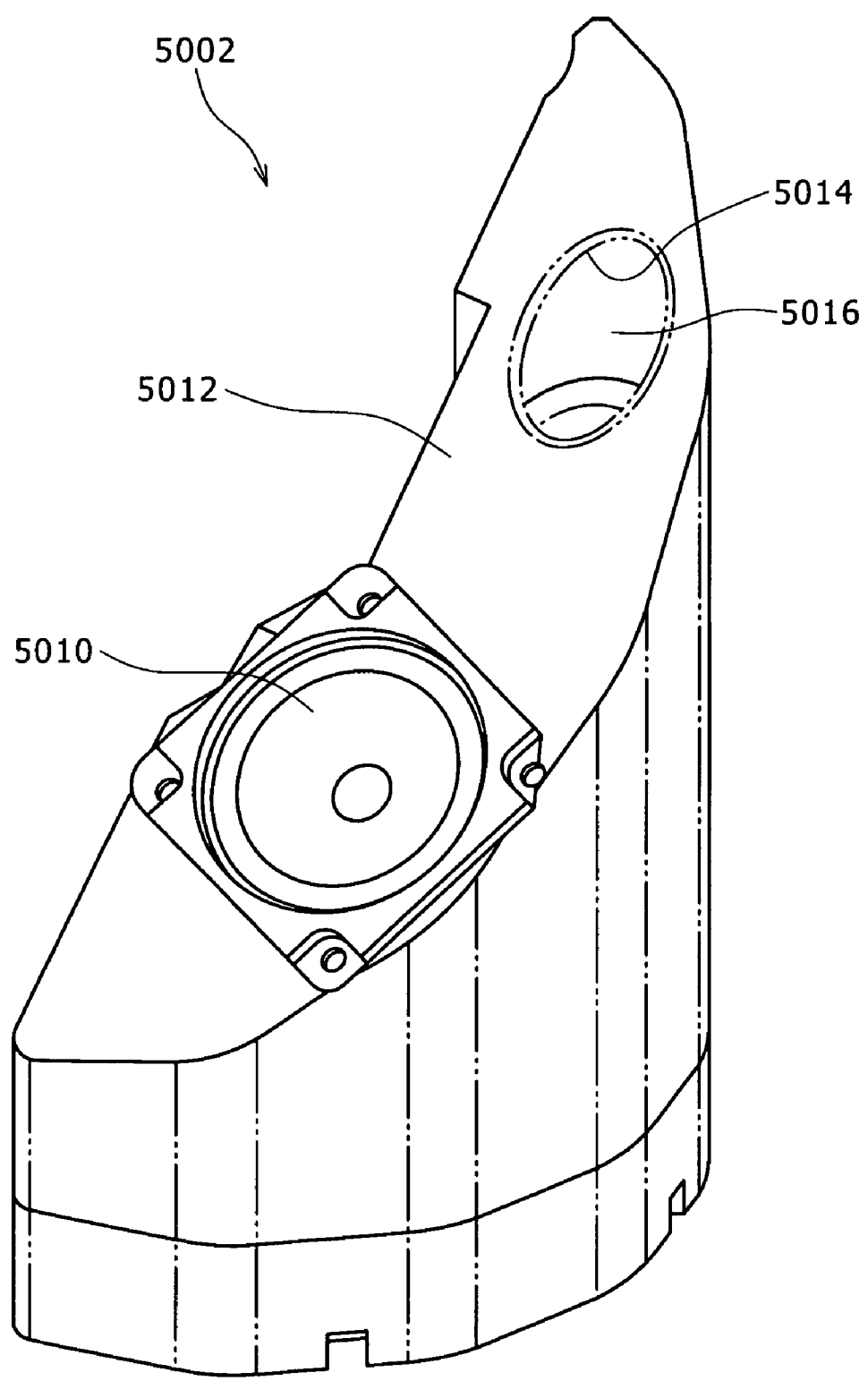
FIG. 22 is a perspective view of each first speaker.

FIG. 20 is an exploded perspective view showing a mounting structure of the first speakers 5002, FIG. 21 is a plan view illustrating the first speakers 5002 provided at the upper end of the cover 2256, and FIG. 22 is a perspective view of each first speaker 5002.

As shown in FIGS. 20 and 21, the first speakers 5002 are provided at the upper end of the lower swiveling portion 22A.

More specifically, the upper end of the hollow cylindrical cover 2256 has an elliptical shape cut along a first plane obliquely intersecting a second plane perpendicular to the axis of the cylindrical cover 2256 and oriented to the front side of the display unit 12.

Accordingly, the upper end of the cover 2256 is formed with an elliptical opening 2280 opening upward and oriented to the front side of the display unit 12.

In other words, the first speakers 5002 are provided inside of the cover 2256 as a hollow cylindrical member so as to be exposed to the opening 2280 and oriented to the front side of the display unit 12.

In this preferred embodiment, the first pivot portion 200 constituting the base end (lower end) of the first arm 24 is positioned at the center of the opening 2280, and the two first speakers 5002 are located on the opposite sides of the first pivot portion 200.

The opening 2280 is covered with a sound transmittable cover 2282 such as a net or a punched sheet. In FIG. 20, reference numeral 2284 denotes a speaker grille, and reference numeral 2286 denotes an ornamental bracket.

Each first speaker 5002 includes a speaker unit 5010 for producing sounds, a cabinet (enclosure) 5012 in which the speaker unit 5010 is built, a port (hole) 5014 formed on the front surface of the cabinet 5012, and a duct (cylinder) 5016 built in the port 5014. The port 5014 and the duct 5016 function to guide the sounds produced from the back surface of the speaker unit 5010 to the front side of the cabinet 5012.

In this preferred embodiment, the speaker units 5010 of the first speakers 5002 are oriented to the front side of the display unit 12, and the sound axes (the center lines) of the speaker units 5010 divergently extend toward the front side of the speaker units 5010. In other words, the front surfaces of the speaker units 5010 are oriented slightly outside in the laterally opposite directions.

Accordingly, even if the distance between the sound axes of the first speakers 5002 is small, a stereophonic sound field can be formed on the front side of the display unit 12 by the sounds produced from the first speakers 5002, so that it is advantageous in providing a rich stereophonic feed to the operator present in front of the display unit 12.

According to this preferred embodiment, the first speakers 5002 are provided in the swiveling portion 22 rather than in the display unit 12. Accordingly, the frame 1204 surrounding the display panel 1202 can be made compact. In other words, the area of the frame 1204 that does not display an image as viewed from the front side of the display panel 1202 can be reduced. Accordingly, the operator can obtain a floating feel such that the display unit 12 is position-changeably supported to the stand 20 as if it is floating in the air, and it is therefore advantageous in improving the design.

Further, the first speakers 5002 are provided in the swiveling portion 22 so as to be oriented to produce sounds toward the front side of the display unit 12. Accordingly, even when the display unit 12 is turned, a sound image by the sounds produced from the first speakers 5002 can typically be localized in front of the display unit 12.

Accordingly, it is needless to say that the operator can enjoy images and sounds as in a television unit in the past corresponding to the incorporation of the speaker 50 into the display unit 12. Moreover, a different taste can be added to the television unit 10 according to an embodiment of the present invention, so that it is advantageous in improving the purchasing power to the television unit 10.

Further, the first speakers 5002 are provided in the lower swiveling portion 22A having a large sectional area that is rotatably connected to the mounting portion 21. Accordingly, as compared with a television unit in the past corresponding to the incorporation of the speaker 50 into the display unit 12, the stand 20 for supporting the display unit 12 can be reduced in weight and size, and it is therefore advantageous in providing the floating feed to the operator.

Further, since the first speakers 5002 are provided in the lower swiveling portion 22A, it is unnecessary to use any special mounting member for mounting the speakers, and it is therefore advantageous in reducing the number of parts and the cost.

In this preferred embodiment, the second speakers 5004 for producing sounds in the high frequency range are provided on the handle 52 for turning the display unit 12.

Accordingly, when the display unit 12 is largely moved frontward from the lower swiveling portion 22A as shown in FIGS. 14A and 14B, the distance from the operator present in front of the display unit 12 to the second speakers 5004 becomes relatively short, and the distance from the operator to the first speakers 5002 becomes relatively long.

As a result, strictly speaking, the sounds in the high frequency range produced from the sound speakers 5004 reach the operator earlier than the sounds in the middle and low frequency ranges produced from the first speakers 5002.

However, the sounds in the high frequency range can be perceived more easily than the sounds in the middle and low frequency ranges from the viewpoint of human hearing characteristics. Therefore, in actual, the operator cannot feel the delay of the sounds in the middle and low frequency ranges produced from the first speakers 5002, but can feel as if the sounds in all of the high, middle, and low frequency ranges are produced from near the display unit 12. Thus, it is therefore advantageous in providing high-quality sounds irrespective of the position of the display unit 12 in the frontward and rearward direction.

Further, according to this preferred embodiment, the first speakers 5002 are provided in the hollow cylindrical cover 2256 so as to be exposed to the opening 2280 and oriented to produce the sounds toward the front side of the display unit 12.

Accordingly, the opening 2280 can be positioned at the level below the operator's ears, so that the sounds produced from the first speakers 5002 can easily reach the operator's ears. Thus, it is therefore advantageous in providing high-quality sounds.

While the speaker 50 is composed of the first speakers 5002 for the middle and low frequency ranges and the second speakers 5004 for the high frequency range in this preferred embodiment, the configuration of the speaker 50 according to an embodiment of the present invention is arbitrary.

For example, a pair of full-range speakers each for producing sounds in the low to high frequency range may be provided in the low swiveling portion 22A without providing the second speakers 5004 for the high frequency range on the handle 52.

Second Preferred Embodiment

A second preferred embodiment of the present invention will now be described with reference to FIGS. 23 and 24.

While the first speakers 5002 are provided in the lower swiveling portion 22A at the upper end thereof in the first preferred embodiment mentioned above, the position of the first speakers 5002 is not limited.

Figure 23:
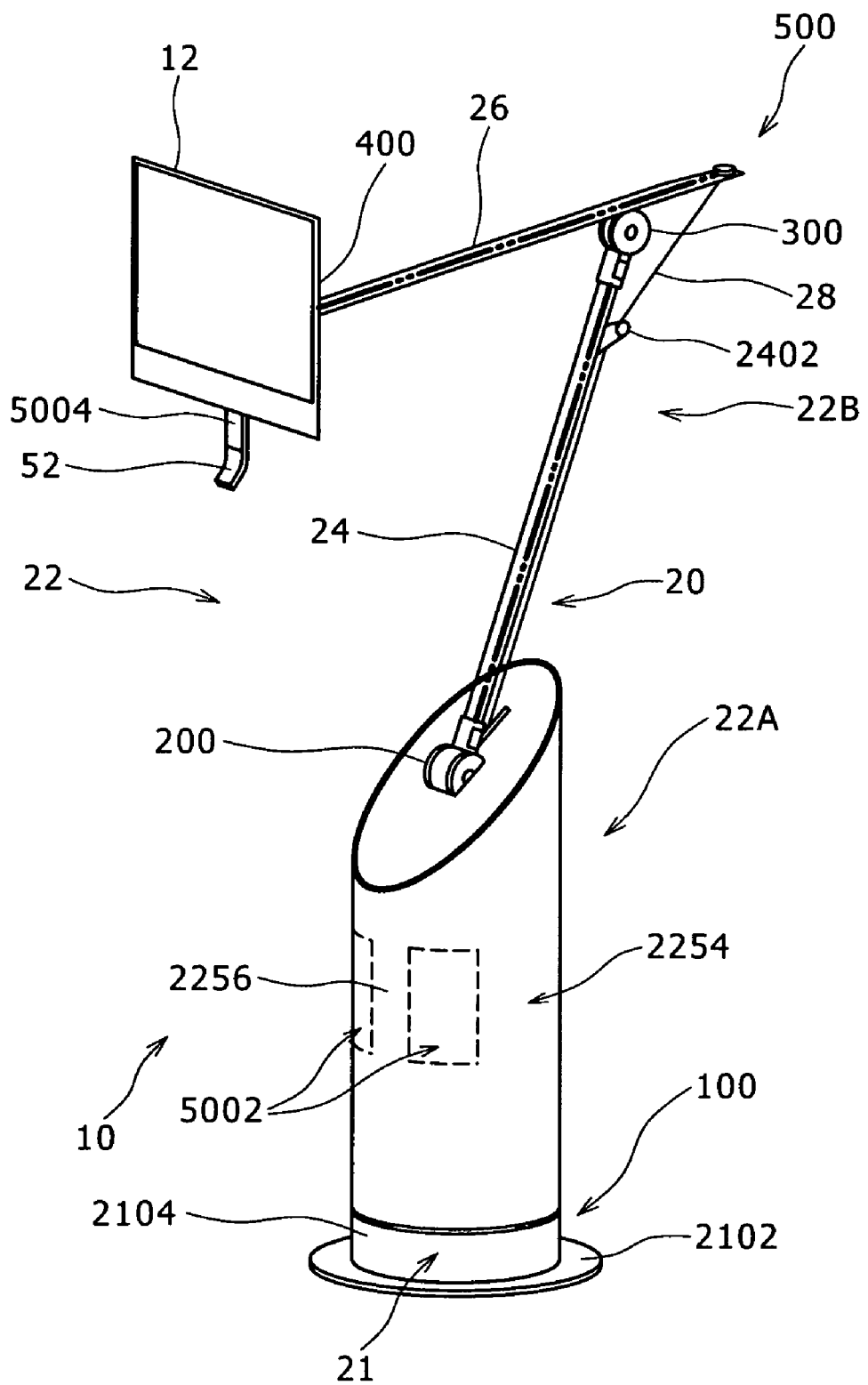
FIG. 23 is a perspective view of a television unit according to a second preferred embodiment of the present invention.
Figure 24:
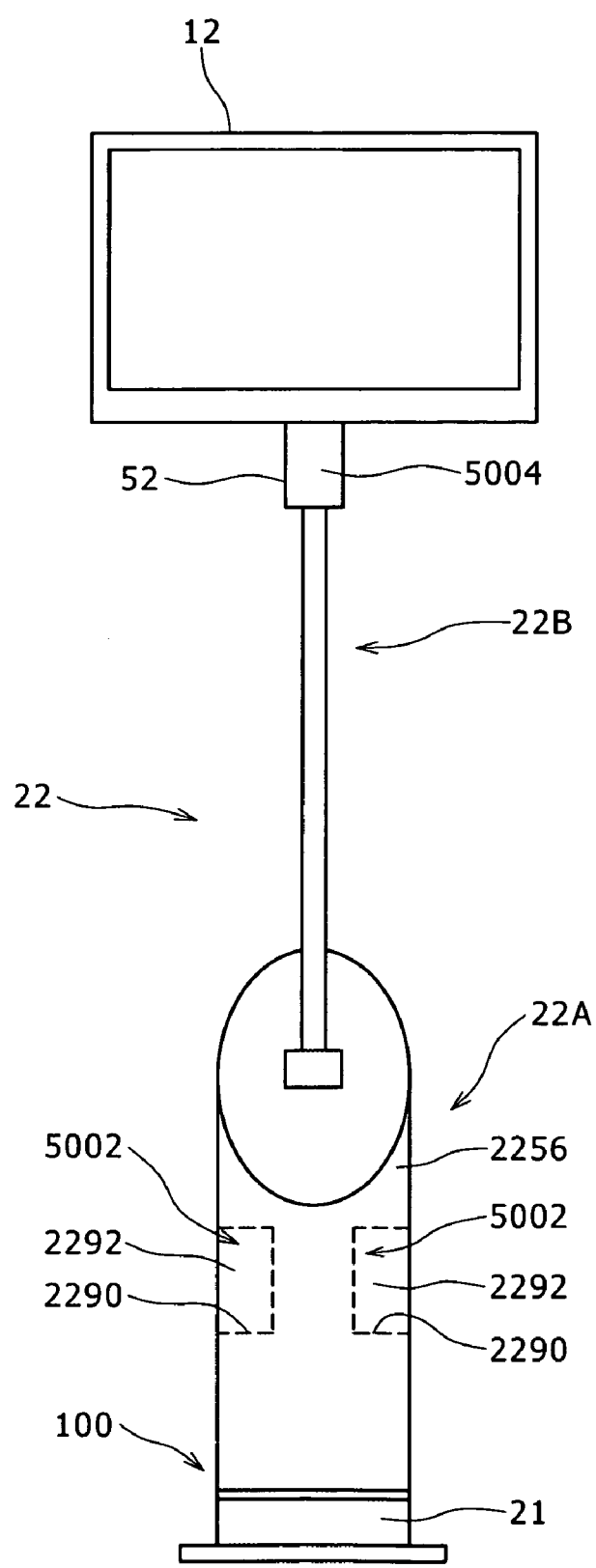
FIG. 24 is a front elevation of the television unit shown in FIG. 23.

FIG. 23 is a perspective view showing a television unit 10 according to the second preferred embodiment, and FIG. 24 is a front elevation of the television unit 10 shown in FIG. 23. In the following description of the second preferred embodiment, substantially the same parts as those in the first preferred embodiment are denoted by the same reference numerals.

As shown in FIGS. 23 and 24, the first speakers 5002 are provided inside of the cylindrical wall portion of the cover 2256 in the lower swiveling portion 22A at right and left positions laterally spaced apart from each other.

More specifically, the cylindrical wall portion of the cover 2256 is formed with a pair of right and left openings 2290 oriented to the front side of the display unit 12.

The first speakers 5002 are provided inside of the cover 2256 so as to be exposed to the openings 2290, respectively, so that the sounds produced from the first speakers 5002 are directed toward the front side of the display unit 12.

Each opening 2290 is covered with a sound transmittable cover 2292 such as a net or a punched sheet.

The second preferred embodiment can exhibit effects similar to those of the first preferred embodiment mentioned above.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A television unit comprising a thin platelike display unit, a stand for rotatably supporting said display unit, and a speaker, wherein:
   said stand includes a mounting portion adapted to be mounted at a suitable position and a swiveling portion rotatably connected to said mounting portion for supporting said display unit; and
   said speaker is provided in said swiveling portion of said stand.

2. The television unit according to claim 1, wherein said speaker is provided in said swiveling portion so that sounds produced from said speaker are oriented toward the front side of said display unit.

3. The television unit according to claim 2, wherein said swiveling portion comprises a lower swiveling portion rotatably connected to said mounting portion and an upper swiveling portion provided on the upper side of said lower swiveling portion and formed so as to have a sectional area smaller than that of said lower swiveling portion and to have a front end for supporting said display unit; and
   said speaker is provided in said lower swiveling portion.

4. The television unit according to claim 2, wherein said swiveling portion comprises a lower swiveling portion rotatably connected to said mounting portion and an upper swiveling portion provided on the upper side of said lower swiveling portion and formed so as to have a sectional area smaller than that of said lower swiveling portion and to have a front end for supporting said display unit;
   said lower swiveling portion includes a hollow member; and
   said speaker is enclosed in said hollow member.

5. The television unit according to claim 2, wherein said swiveling portion comprises a lower swiveling portion rotatably connected to said mounting portion and an upper swiveling portion provided on the upper side of said lower swiveling portion and formed so as to have a sectional area smaller than that of said lower swiveling portion and to have a front end for supporting said display unit;

said lower swiveling portion includes a hollow member;

said hollow member has an upper end formed with an opening oriented toward the front side of said display unit;

said speaker is provided inside of said hollow member so as to be exposed to said opening so that sounds produced from said speaker are oriented toward the front side of said display unit; and said opening is covered with a sound transmittable member.

6. The television unit according to claim 5, wherein said upper swiveling portion projects upward from the center of said opening, and said speaker comprises a pair of speakers disposed on both sides of said upper swiveling portion at a base end thereof.

7. The television unit according to claim 2, wherein said swiveling portion comprises a lower swiveling portion rotatably connected to said mounting portion and an upper swiveling portion provided on the upper side of said lower swiveling portion and formed so as to have a sectional area smaller than that of said lower swiveling portion and to have a front end for supporting said display unit;

said lower swiveling portion includes a hollow member;

said hollow member has a front surface formed with an opening;

said opening is covered with a sound transmittable member; and said speaker is provided inside of said hollow member so as to be exposed to said opening so that sounds produced from said speaker are oriented toward the front side of said display unit.

8. The television unit according to claim 2, wherein said speaker comprises a first speaker for producing sounds in a middle frequency range and in a low frequency range and a second speaker for producing sounds in a high frequency range;

said first speaker is provided in said lower swiveling portion;

said display unit is provided with a handle for use in turning said display unit; and said second speaker is provided on said handle of said display unit.

9. The television unit according to claim 8, wherein said handle has a speaker mounting portion projecting outward from the contour of said display unit so as to be oriented to the front side of said display unit; and said second speaker is mounted on said speaker mounting portion of said handle.

10. The television unit according to claim 1, wherein said swiveling portion comprises a lower swiveling portion rotatably connected to said mounting portion and an upper swiveling portion provided on the upper side of said lower swiveling portion and formed so as to have a sectional area smaller than that of said lower swiveling portion and to have a front end for supporting said display unit;

said lower swiveling portion includes a hollow member extending vertically;

said hollow member has an upper end formed with an opening oriented toward the front side of said display unit;

said opening is formed by cutting said upper end along a first plane obliquely intersecting a second plane perpendicular to the axis of said hollow member and oriented to the front side of said display unit;

said speaker is provided inside of said hollow member so as to be exposed to said opening so that sounds produced from said speaker are oriented toward the front side of said display unit; and said opening is covered with a sound transmittable member.

11. The television unit according to claim 10, wherein said speaker comprises a pair of right and left speakers provided in said hollow member so as to be exposed to said opening and oriented toward the front side of said display unit, the sound axes of said right and left speakers extending divergently toward the front side of said display unit.

12. The television unit according to claim 10, wherein said upper swiveling portion projects upward from the center of said opening, and said speaker comprises a pair of speakers disposed on both sides of said upper swiveling portion at a base end thereof.

* * * * *